INVENTORS
ROBERT STEENECK
JOHN R. COWAN
BY J. B. Burke
ATTORNEY

LEGEND:

*** ≡ CHECK CHARACTER FOR DATA IMMEDIATELY PRECEDING.

$CCC_1$ ≡ RETURNING ACCEPT-REJECT SIGNAL FOR DATA LAST SENT BY SLAVE SENDER.

$CCC_2$ ≡ RETURNING ACCEPT-REJECT SIGNAL FOR DATA LAST SENT BY MASTER SENDER.

T ≡ TIME REQUIRED FOR DATA TO BE RECEIVED, COMPARED AND TO GENERATE A $CCC_1$ OR $CCC_2$ SIGNAL.

June 11, 1968 R. STEENECK ETAL 3,388,378

ERROR DETECTION AND CORRECTION APPARATUS FOR DUPLEX COMMUNICATION SYSTEM

Filed Sept. 22, 1964 23 Sheets-Sheet 8

June 11, 1968 R. STEENECK ET AL 3,388,378

ERROR DETECTION AND CORRECTION APPARATUS FOR DUPLEX COMMUNICATION SYSTEM

Filed Sept. 22, 1964 23 Sheets-Sheet 10

June 11, 1968 R. STEENECK ET AL 3,388,378

ERROR DETECTION AND CORRECTION APPARATUS FOR DUPLEX COMMUNICATION SYSTEM

Filed Sept. 22, 1964 23 Sheets-Sheet 13

June 11, 1968 R. STEENECK ETAL 3,388,378

ERROR DETECTION AND CORRECTION APPARATUS FOR DUPLEX COMMUNICATION SYSTEM

Filed Sept. 22, 1964 23 Sheets-Sheet 14

June 11, 1968 R. STEENECK ET AL 3,388,378

ERROR DETECTION AND CORRECTION APPARATUS FOR DUPLEX COMMUNICATION SYSTEM

Filed Sept. 22, 1964 23 Sheets-Sheet 17

June 11, 1968 R. STEENECK ETAL 3,388,378

ERROR DETECTION AND CORRECTION APPARATUS FOR DUPLEX COMMUNICATION SYSTEM

Filed Sept. 22, 1964 23 Sheets-Sheet 23

United States Patent Office 3,388,378
Patented June 11, 1968

3,388,378
ERROR DETECTION AND CORRECTION APPARATUS FOR DUPLEX COMMUNICATION SYSTEM

Robert Steeneck, New York, and John R. Cowan, Brooklyn, N.Y., assignors to Western Union Telegraph Company, New York, N.Y., a corporation of New York Filed Sept. 22, 1964, Ser. No. 398,161
6 Claims. (Cl. 340—146.1)

ABSTRACT OF THE DISCLOSURE

In an error detection and correction apparatus successive blocks of signal data are generated at a transmission terminal and transmitted to a receiving terminal. Each block consists of information signal bits, check signal bits and accept-reject signal bits. At the receiving terminal other signal blocks are generated each consisting of another check signal, information signals and an accept-reject signal. The other check signal is transmitted back to the transmission terminal. If an error occurred in transmission of the signal block, the transmission terminal introduces an error into the check signal bits of the next block to prevent recording of the next block and to permit retransmission and recording of the preceding block until the block is correctly received and recorded.

This invention concerns apparatus for detection of errors occurring in transmission of signals between duplex terminals and for automatic correction of such errors.

The acronym "EDAC" meaning "Error Detection-Automatic Correction" is employed for the sake of brevity in the following description to represent the apparatus and system embodying the invention.

The problem of error control in data transmission has long been an outstanding one for which no satisfactory solution has heretofore been found. The EDAC system is directed at solving this problem. The EDAC system detects errors occurring in transmitted coded signals and automatically corrects them. The errors may result from a noisy transmission medium such as a high frequency radio circuit where extreme fading and intense magnetic activity introduce numerous gaps in the transmitted information. Such conditions make meaningful communications almost impossible. In order to reduce the difficulties caused by a "noisy" transmission medium the EDAC system produces error-free data communication by retransmitting errored information until it is received correctly.

The EDAC system performs the function of error detection by resorting to redundancy of transmission in a novel way. In the EDAC system redundancy is obtained from a binary summation of stored information, and this summation is used as a check criterion. To accommodate the binary summation process, and the subsequent check comparison, the EDAC system employs two memory units in transceivers at both sending and receiving terminal equipment, from which stored information may be transmitted as often as required.

In a duplex communications system including a high frequency radio circuit between two terminals, two identical EDAC assemblies will be provided, one at each terminal. Since the system operates duplex, the EDAC apparatus corrects message traffic in both directions. It should be clearly understood, that the EDAC system eliminates only errors generated in the transmission medium; i.e. the errors generated between the output of one terminal and the input of the other terminal. When either terminal is sending message traffic the EDAC apparatus at the sending terminal is operated as a master transceiver while the EDAC apparatus at the receiving terminal is operated as a slave transceiver.

It is therefore a principal object of the invention to provide a system which detects errors occurring in data transmission due to fading or other adverse transmission conditions and which automatically corrects such errors.

Another object is to provide a duplex data transmission system in which either one of two terminals may serve as a master transceiver station sending message traffic while the other terminal serves as a slave transceiver station receiving message traffic and vice versa.

A further object is to provide a system of the character described including memory units at both terminals from which stored information may be repeatedly transmitted until error-free reception is accomplished.

Another object is to provide a duplex sending and receiving method in which a first block of coded signals is transmitted from a master terminal to a slave terminal and is stored in both terminals; then a second block of coded signals is transmitted from master to slave terminals, while the slave terminal reports back to the master terminal whether or not the first block of signals has been correctly received; if the first block has been correctly received, the first block is recorded at the slave terminal and the first block is released from storage at the master terminal so that a third block of coded signals can be transmitted; and if the first block has been incorrectly received, the transmission of the first block is repeated while, the slave terminal withholds recording of the second block; transmission of the third block being withheld until the first block has been correctly received at the slave terminal.

Still another object is to provide a method of error detection and correction in which novel coded signals are transmitted between master and slave transceiver terminals by means of which the occurrence of errors in transmission are detected and corrected.

Figures 5, 5A:
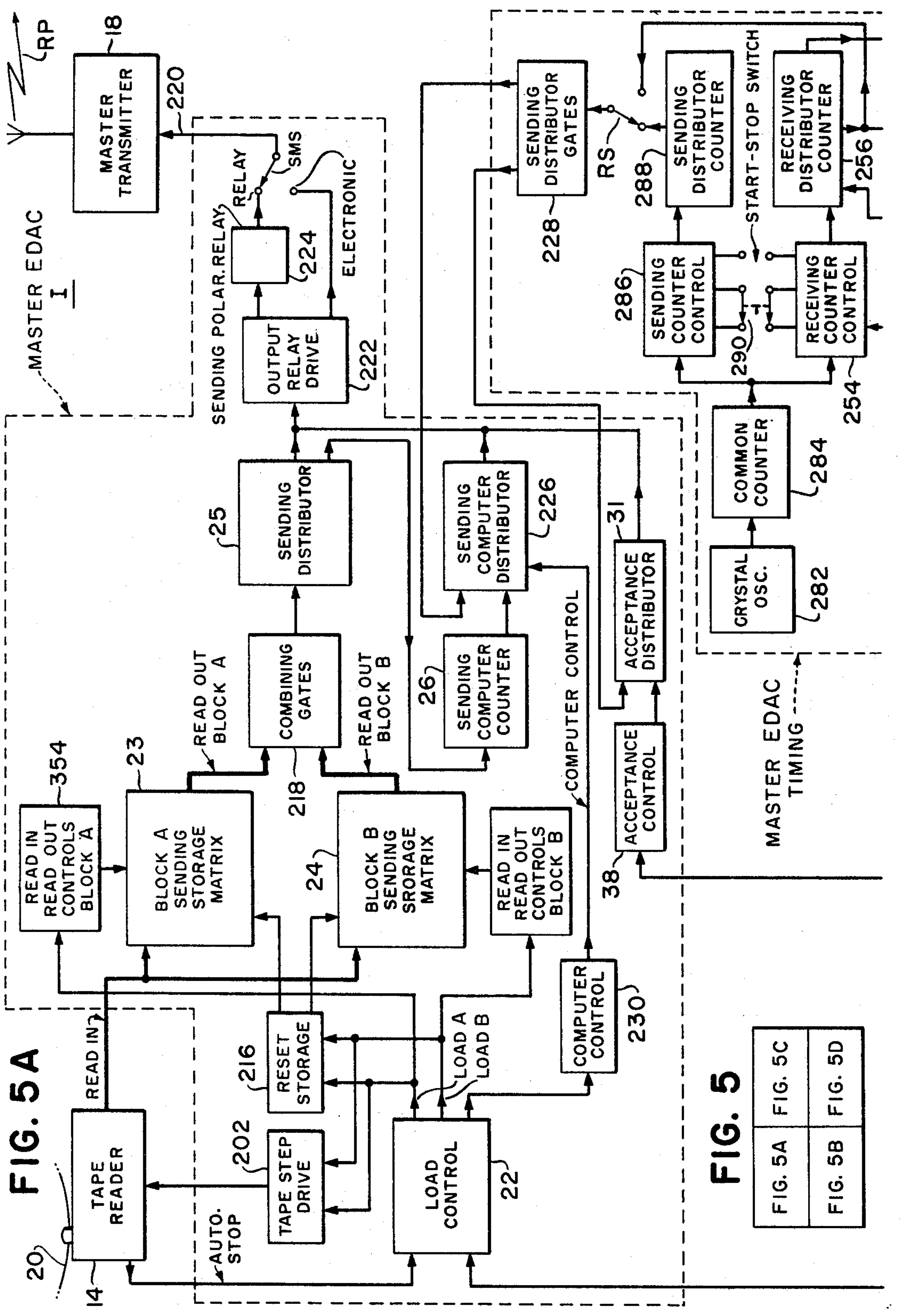
FIGURE 5 is a diagram showing how
FIGURES 5A–5D are to be assembled together as a unit.
Figure 5B:
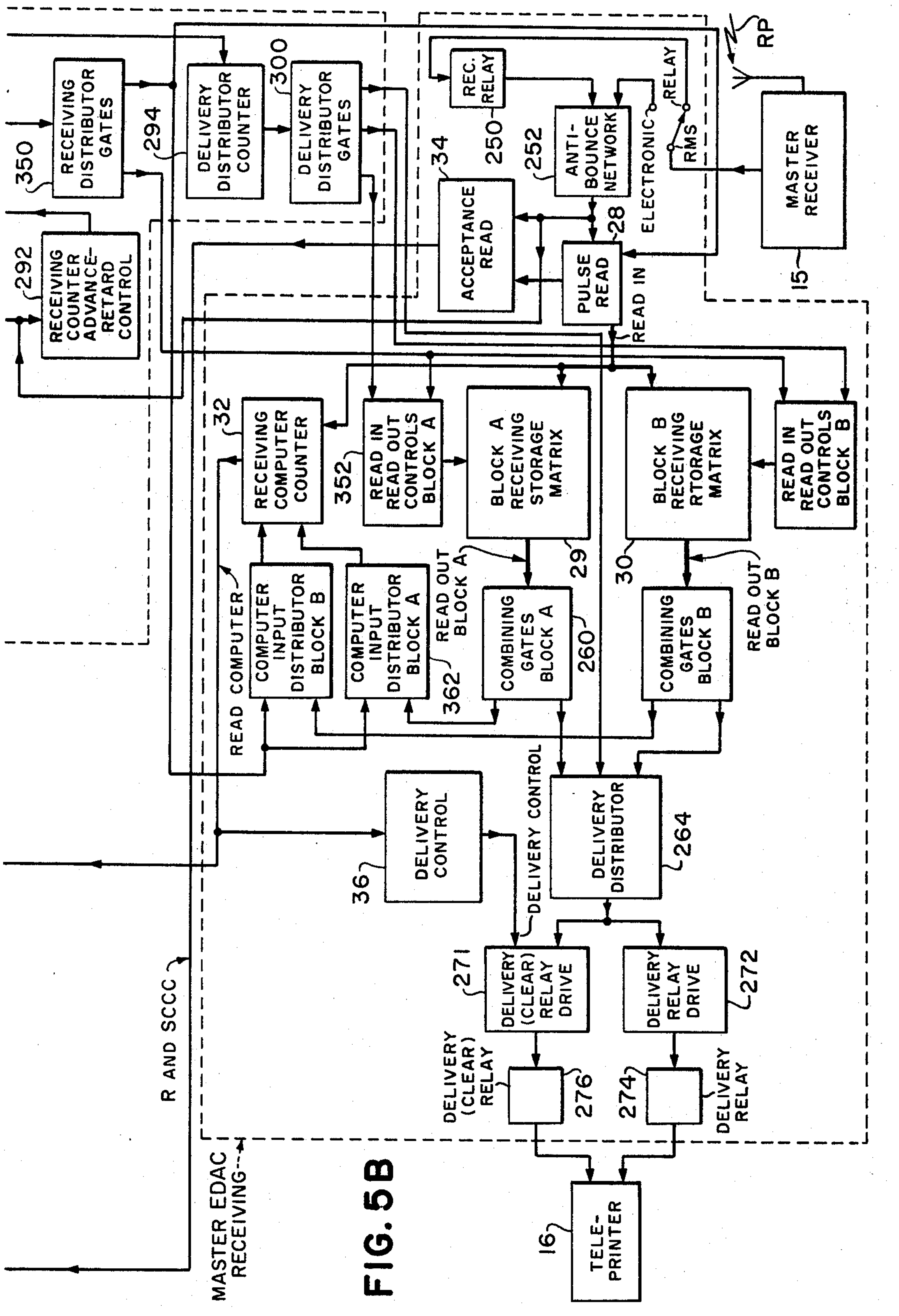
Figure 5C:
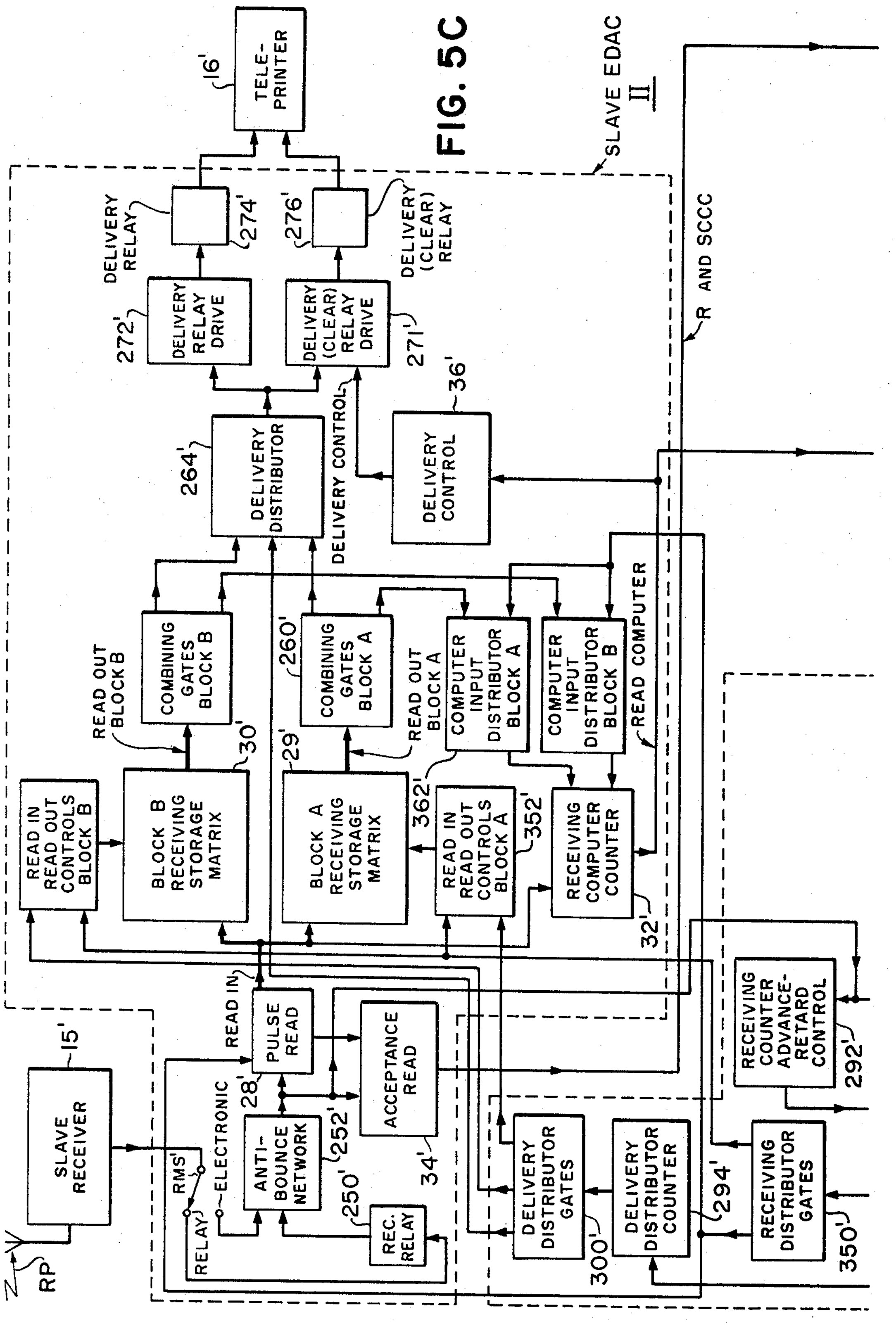
Figure 5D:
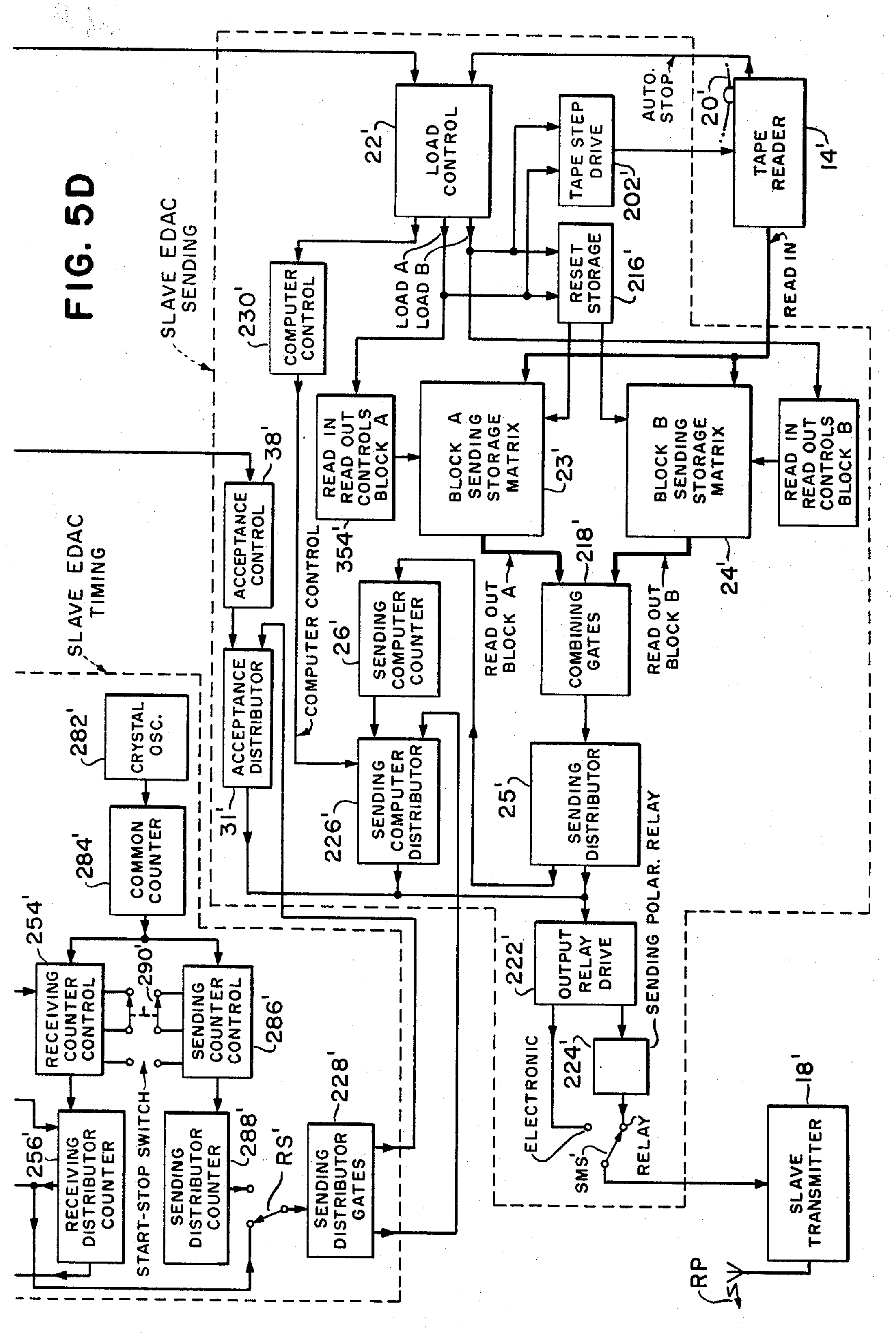
Figure 6:
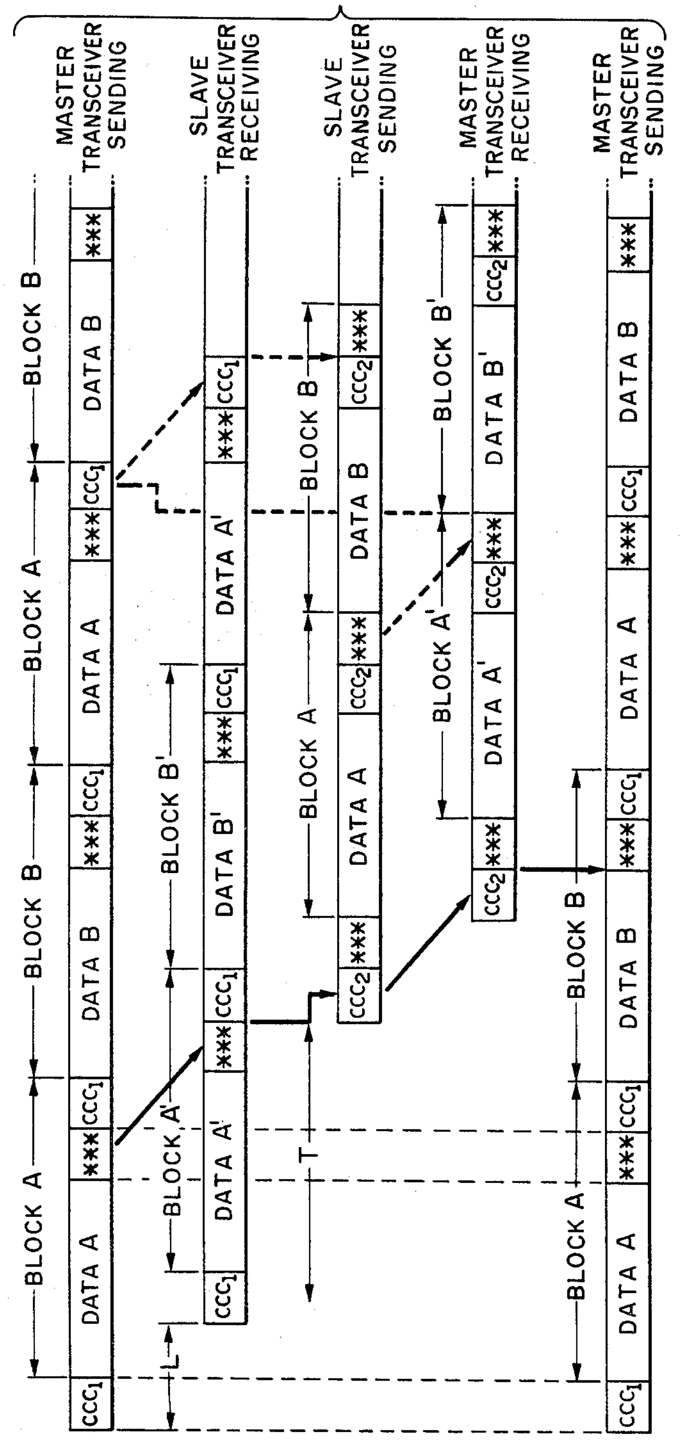
Figures 7, 7A:
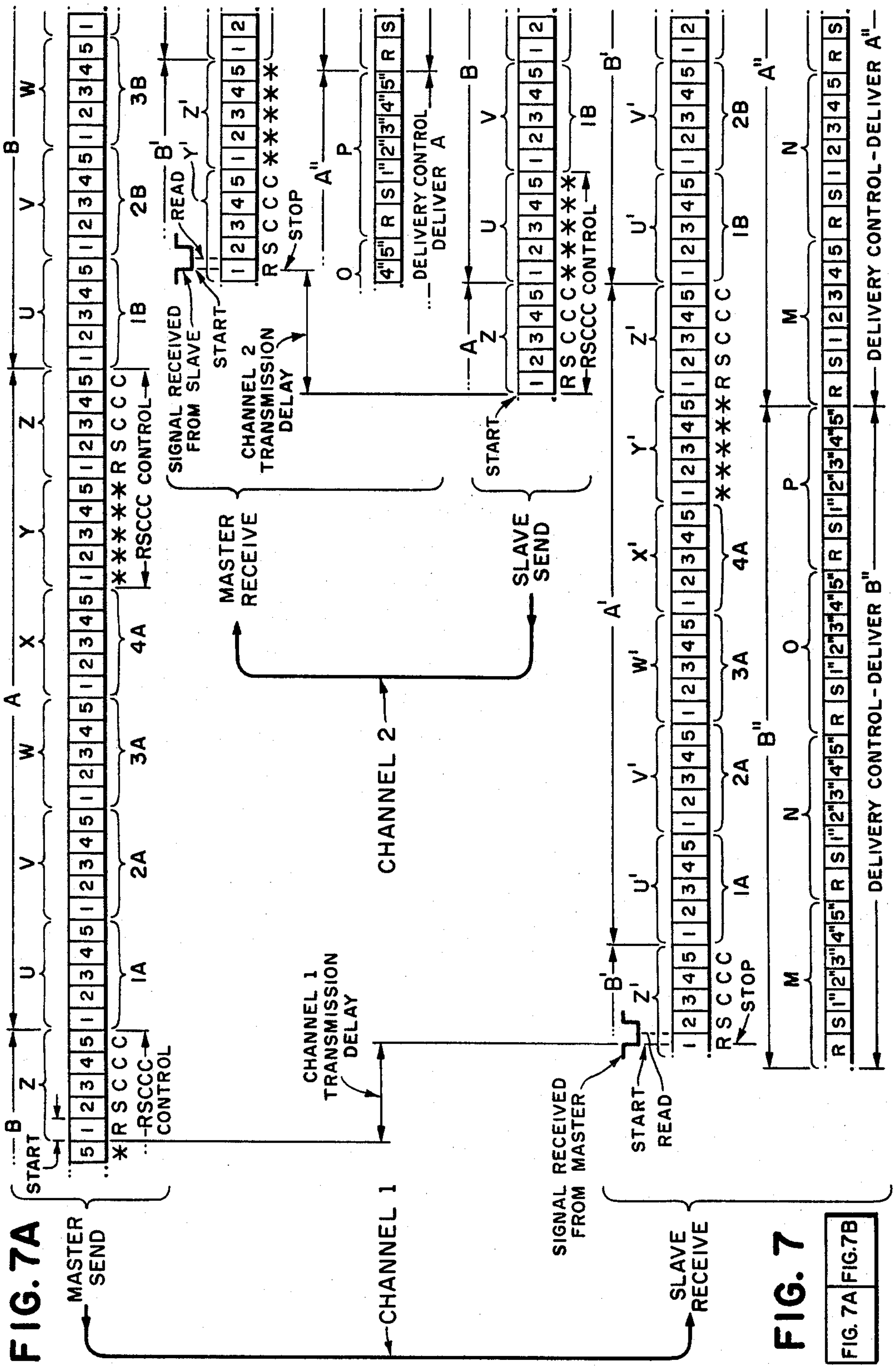
Figure 7B:
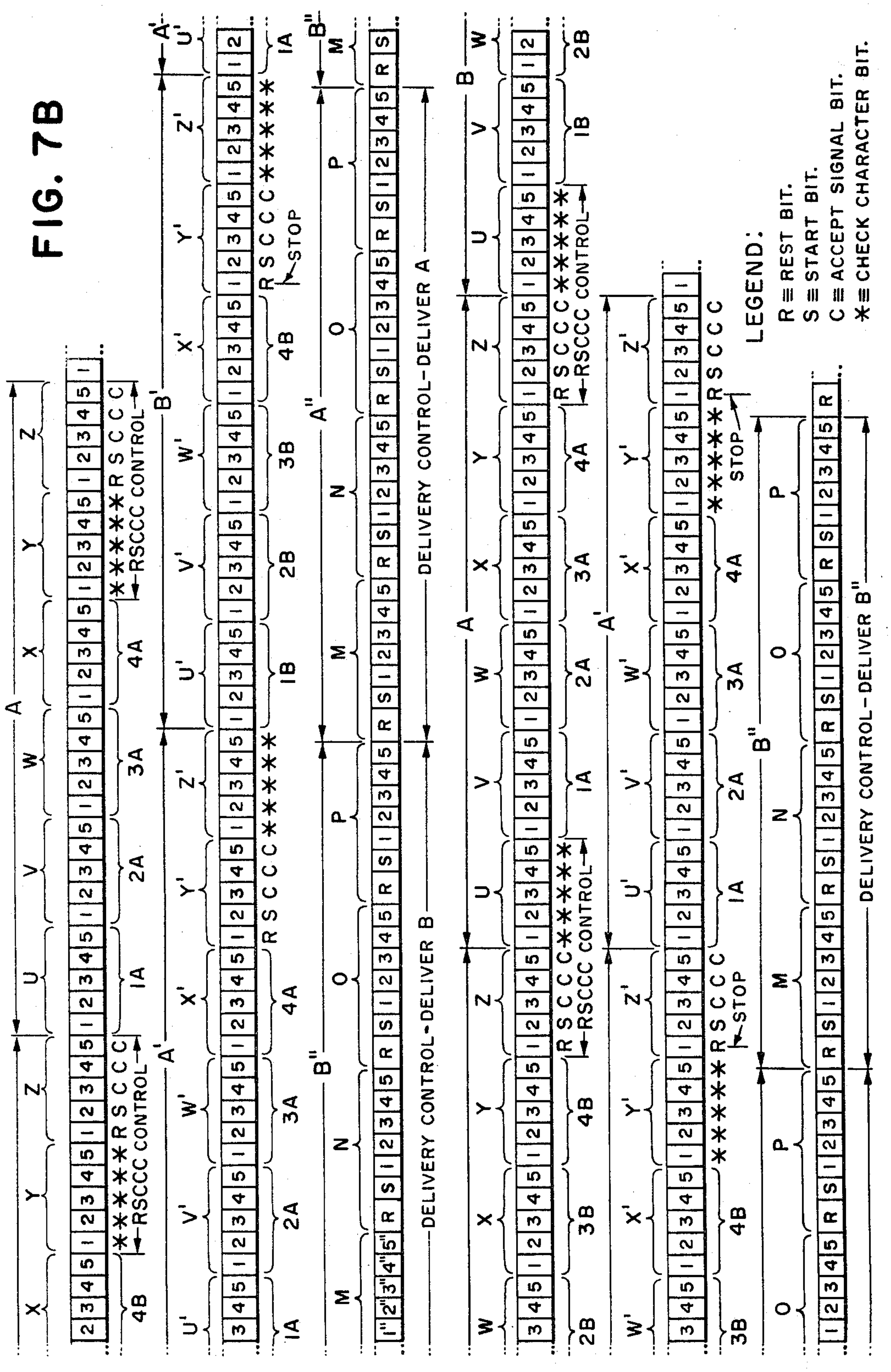
Figure 8A:
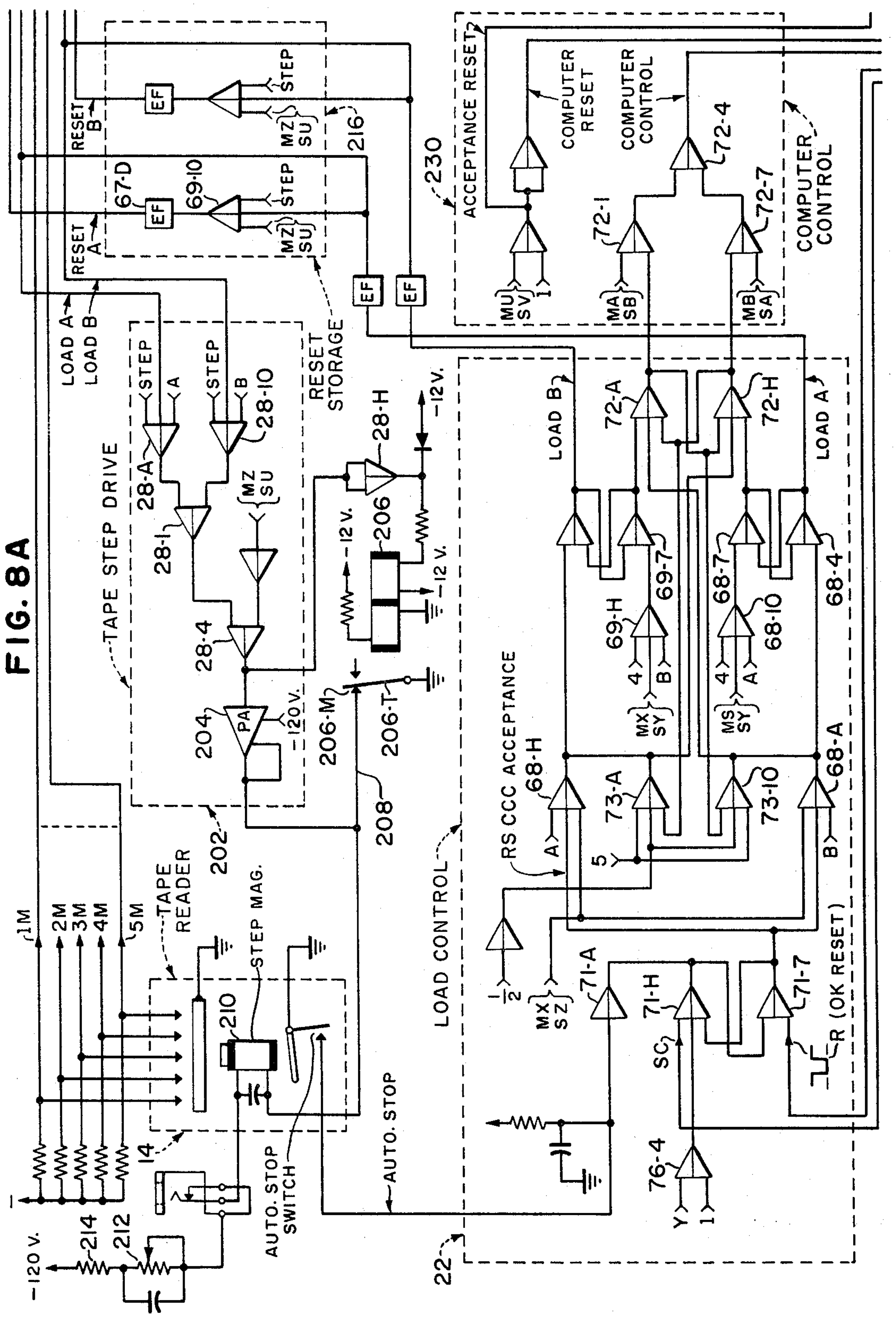
Figures 8, 8B:
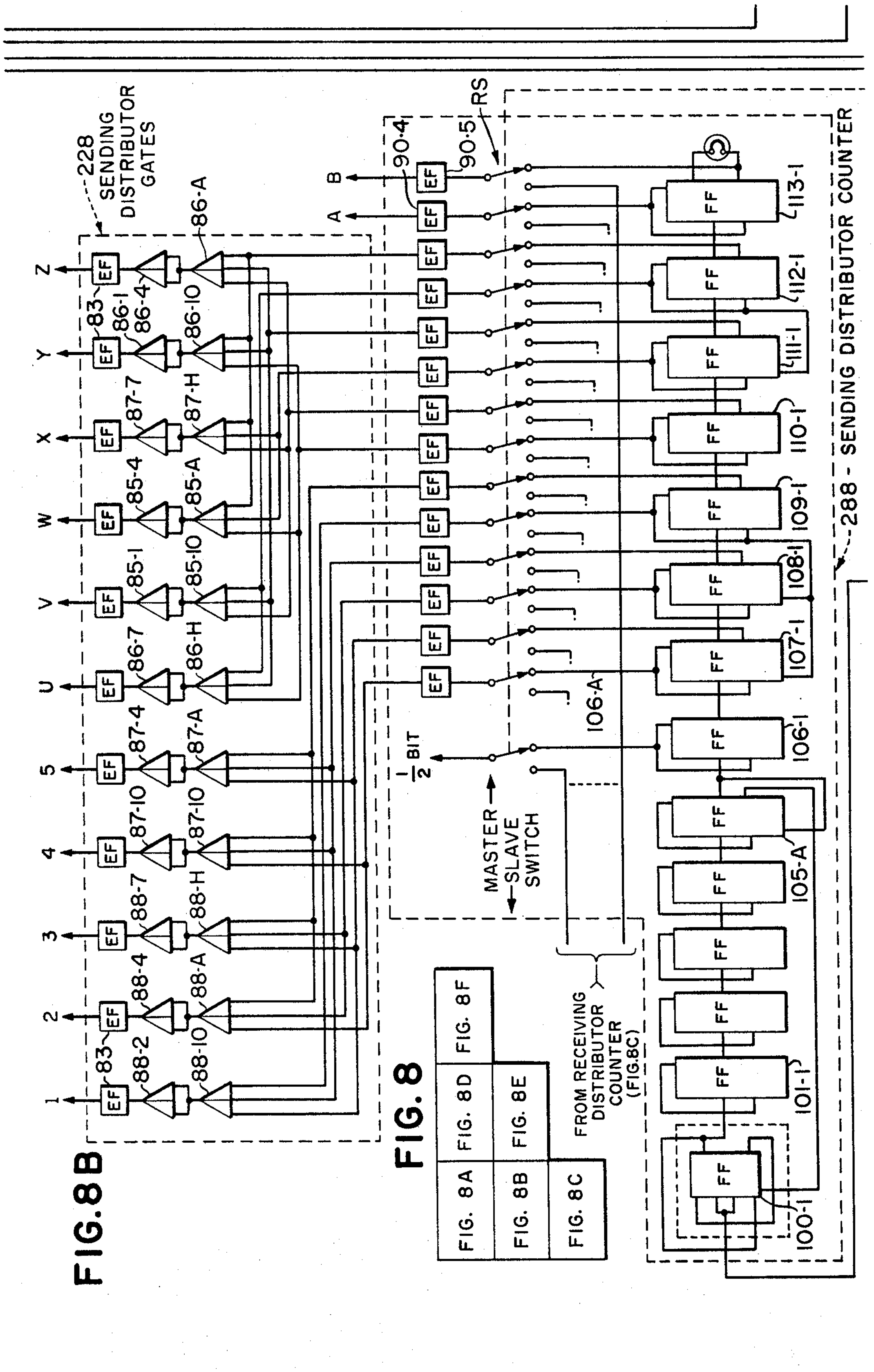
Figures 9, 9A:
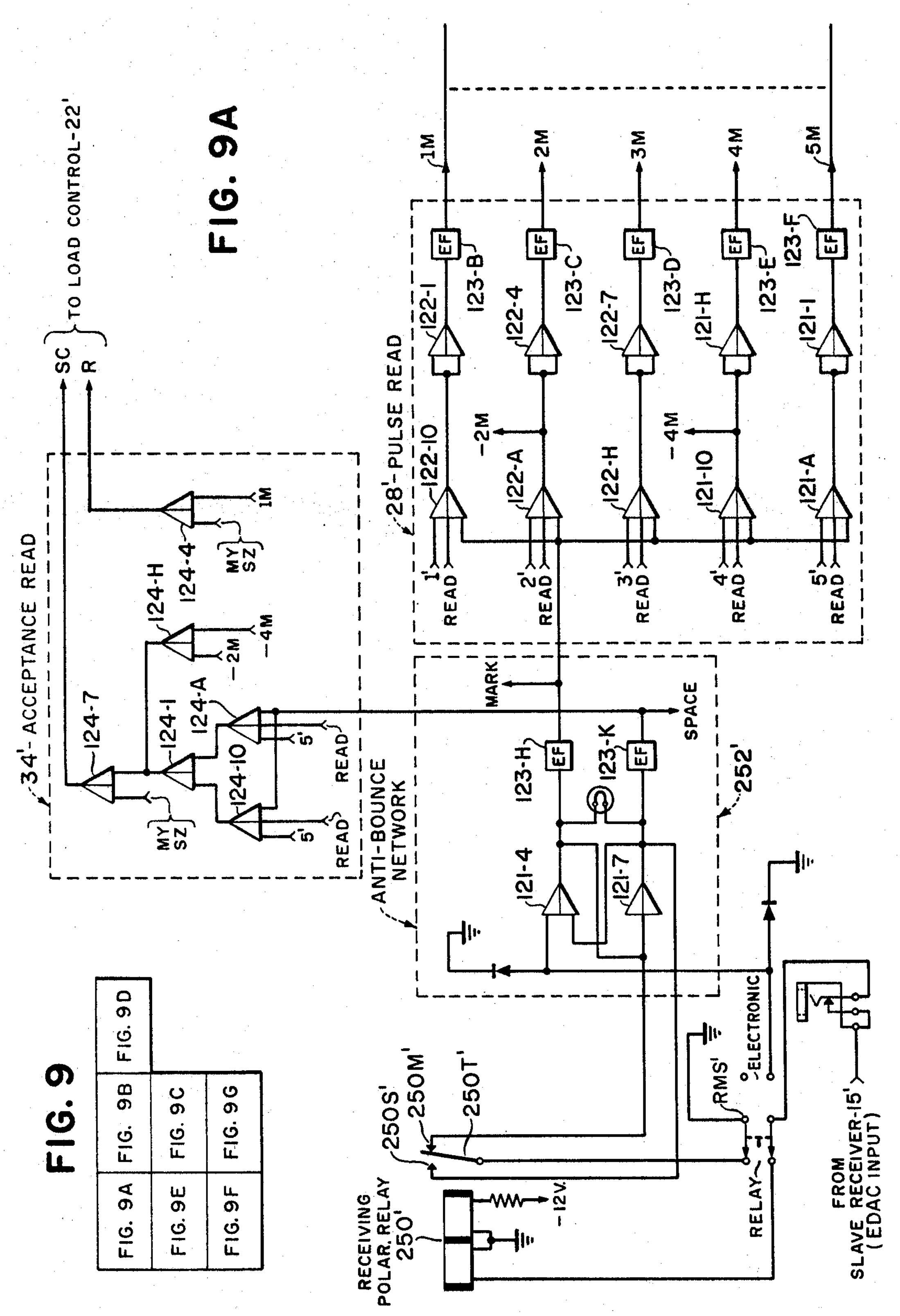
Figure 9B:
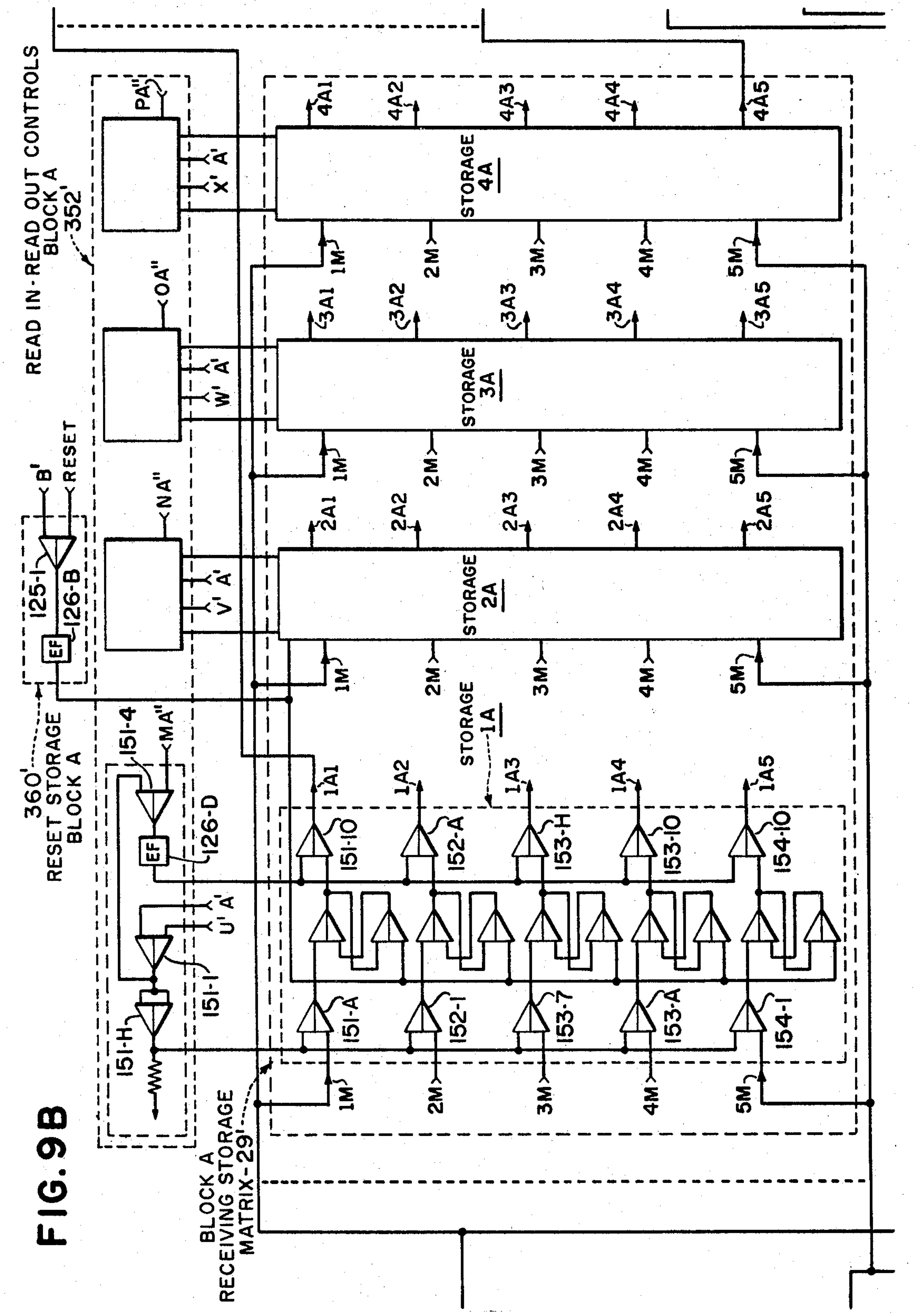
Figure 9C:
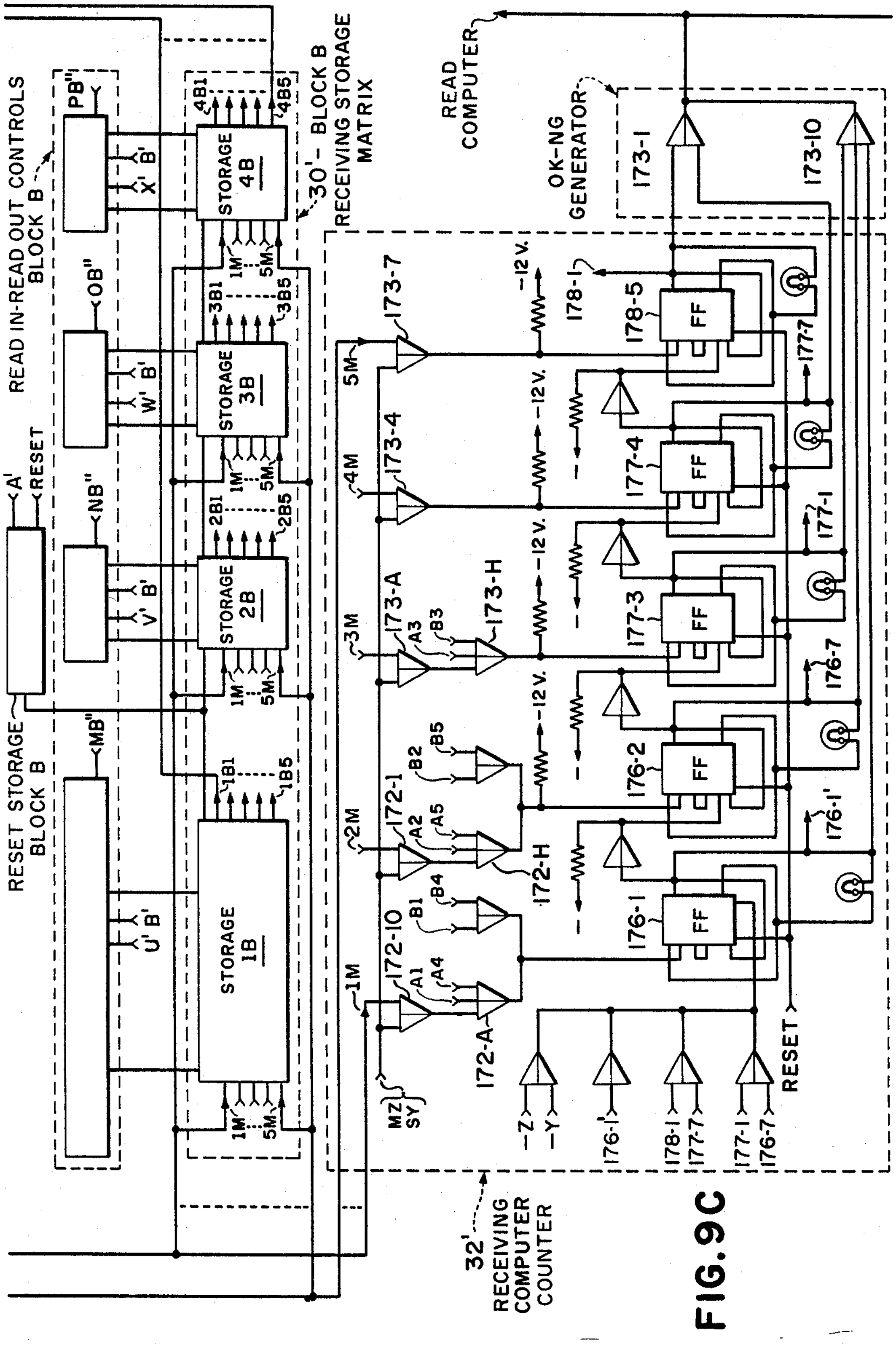
Figure 9D:
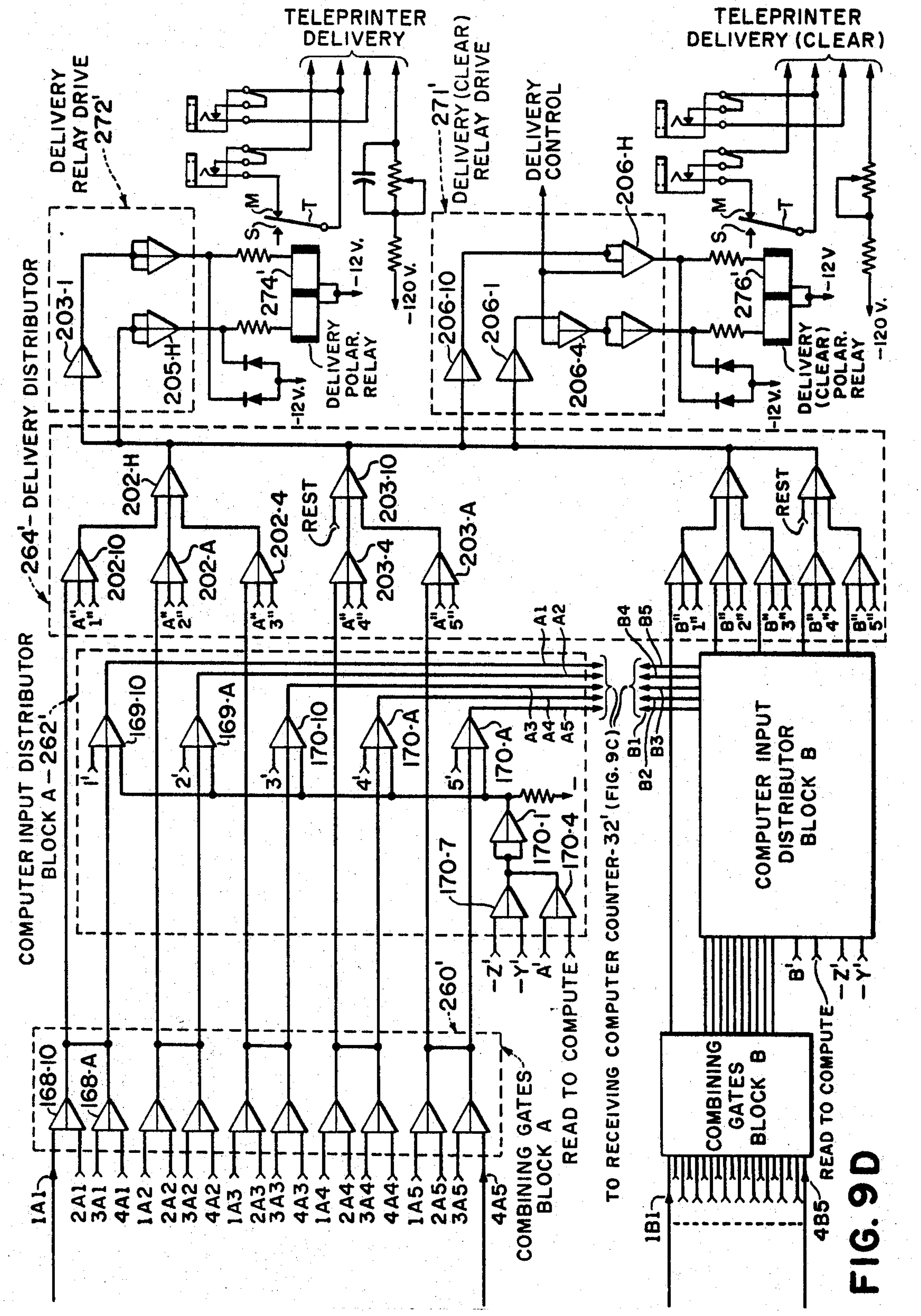

FIGURES 5A–5D taken together constitute a block diagram of a system embodying the invention, including master and slave transceiver terminals;

FIGURE 6 is a simplified graphic diagram of signal pulse block sequences, according to the invention;

FIGURE 7 is a diagram showing how FIGURES 7A, 7B are to be assembled together as a unit;

FIGURES 7A and 7B taken together constitute a graphic diagram of signal pulse block sequences in prescibed relative timing according to the invention;

FIGURE 8 is a diagram showing how FIGURES 8A–8F are to be assembled together as a unit;

FIGURES8A–8F taken together constitute a logic diagram of part of the master transceiver terminal of FIGURES 5A, 5B;

FIGURE 9 is a diagram showing how FIGURES 9A–9G are to be assembled together as a unit;

FIGURES 9A–9G taken together constitute a logic diagram of part of the slave transceiver terminal of FIGURES 5C, 5D.

Figure 10:
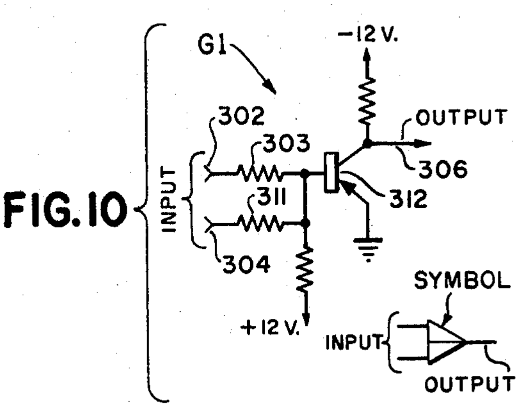
Figure 11:
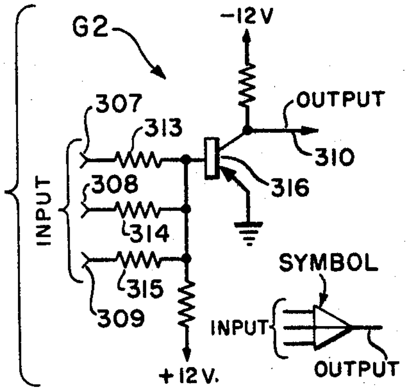
Figure 12:
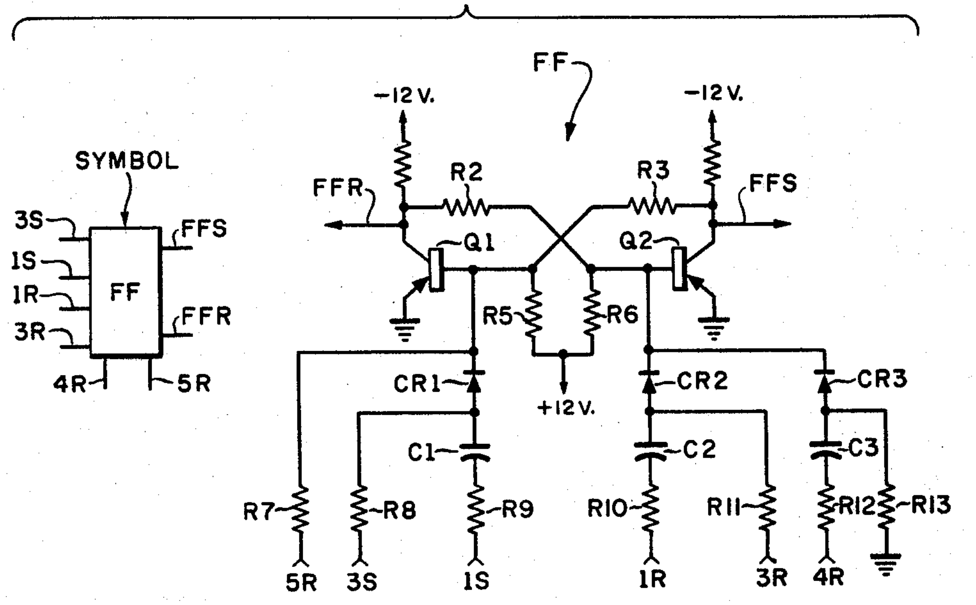
Figure 13:
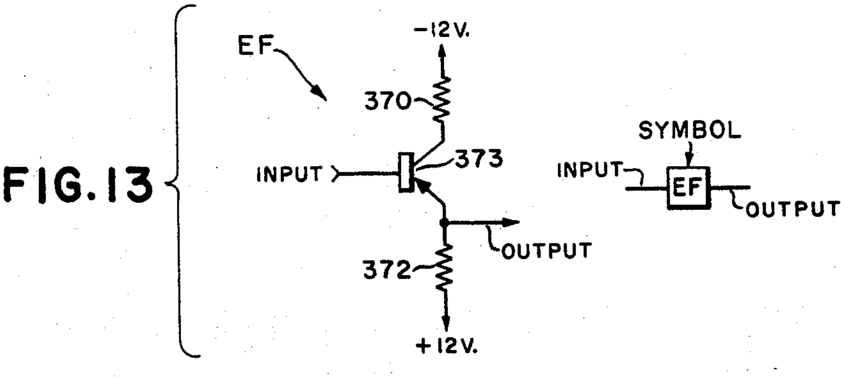

FIGURE 10 and FIGURE 11 are diagrams of typical gate circuits employed in the system;

FIGURE 12 is a diagram of a typical flip-flop circuit employed in the system;

FIGURE 13 is a diagram of a typical emitter follower circuit employed.

Figure 1:
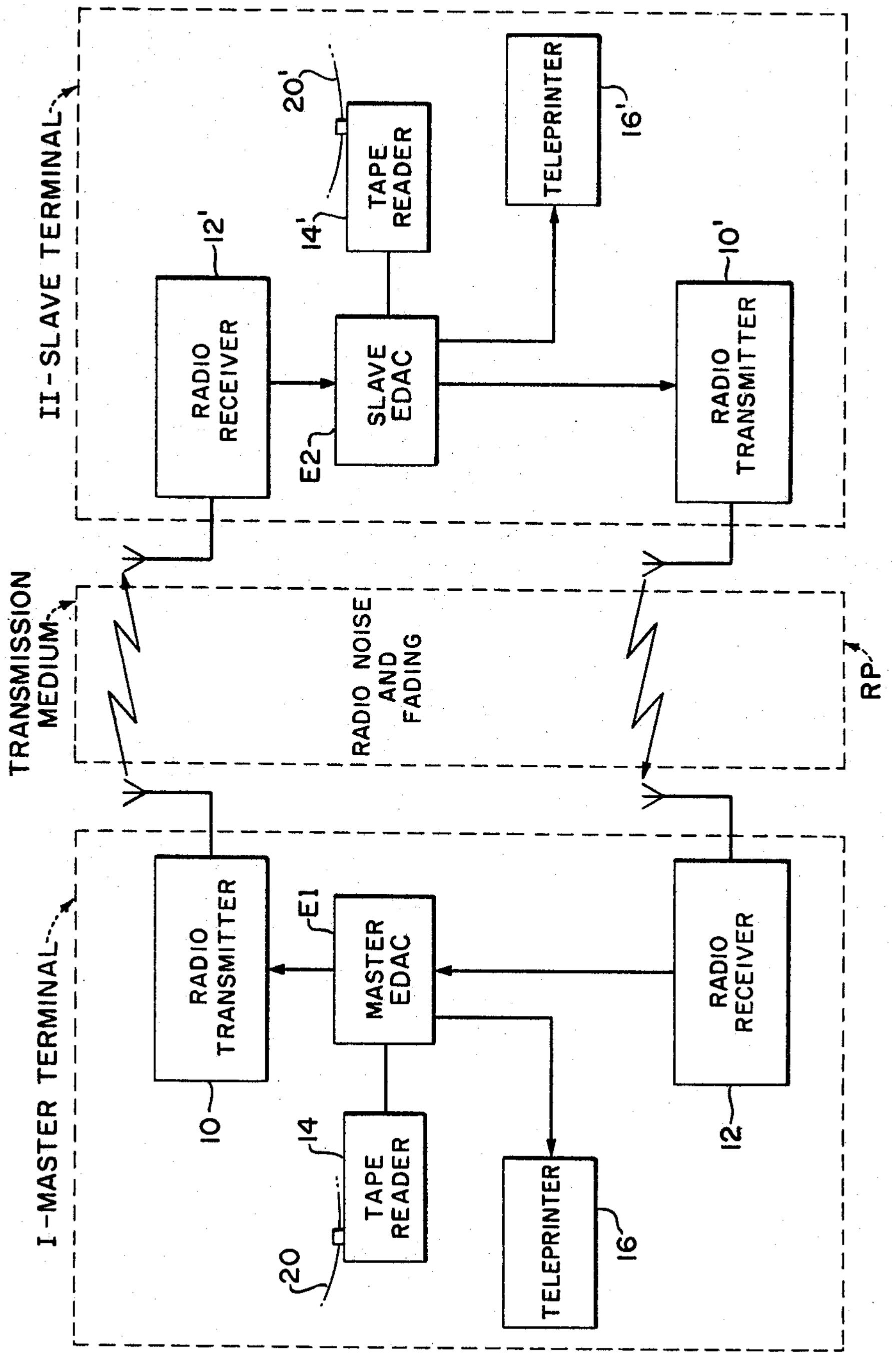
FIGURE 1 is a simplified block diagram of a system embodying the invention.

FIGURE 1 shows a duplex communication system in which two transceiver terminals I and II are in communication via a radio frequency channel RP which is subject to radio noise and fading. Terminal I is operated as a master transceiver with radio transmitter 10, radio receiver 12, and master EDAC apparatus E1. Encoded message traffic is passed from a punched tape reader 14 to the master EDAC for transmission by transmitter 10. Radio receiver 12' at terminal II receives the encoded signals and passes them to slave EDAC apparatus E2. If the signals have been correctly received they are recorded as clean copy by teleprinter 16'. Coded report signals are sent back via transmitter 10' at terminal II to terminal I to indicate correct or incorrect reception of signals. The report signals are received at receiver 12 and passed to the master EDAC E1 where the previously transmitted signals are being held in storage pending receipt of the report signals. The stored signals are cleared from storage if the signals were correctly received at terminal II or are retransmitted if the signals were incorrectly received at terminal II.

Tape reader 14' at terminal II is in standby condition subject to use of terminal II to send message traffic and teleprinter 16' is in standby condition subject to use of terminal I to receive message traffic. The system can be operated in duplex with both terminals simultaneously sending message traffic from punched tape 20, 20'.

In setting up an EDAC system one terminal is designated as the "master" and the second as the "slave" as shown in FIGURE 1. The master terminal I provides the clock frequency from a stable crystal oscillator that is considered to be standard for the system. This frequency is derived from a stable crystal oscillator and is not corrected. The other terminal II then becomes the "slave" terminal with its own crystal oscillator to provide a clock frequency. This clock frequency is synchronized to that of the master terminal through observations of the time positions of start and rest bits in received EDAC signals, so that the circuit operates on a character synchronized basis.

The corrected slave clock drives a slave receiving distributor and also drives a slave sending distributor which may be transmitting independent traffic back to the master terminal I. A switch is provided in each EDAC E1, E2 to allow it to serve in either the "master" or "slave" mode of operation.

*The EDAC signal block*

In EDAC operation information is transmitted in data blocks of fixed length. Each EDAC block contains thirty bits assigned as follows:

20 bits assigned to 4 characters containing 5 bits each;
5 bits assigned to check information;
3 bits assigned to a return acceptance signal;
2 bits assigned to rest-start synchronization.

Figures 2, 3, 4:
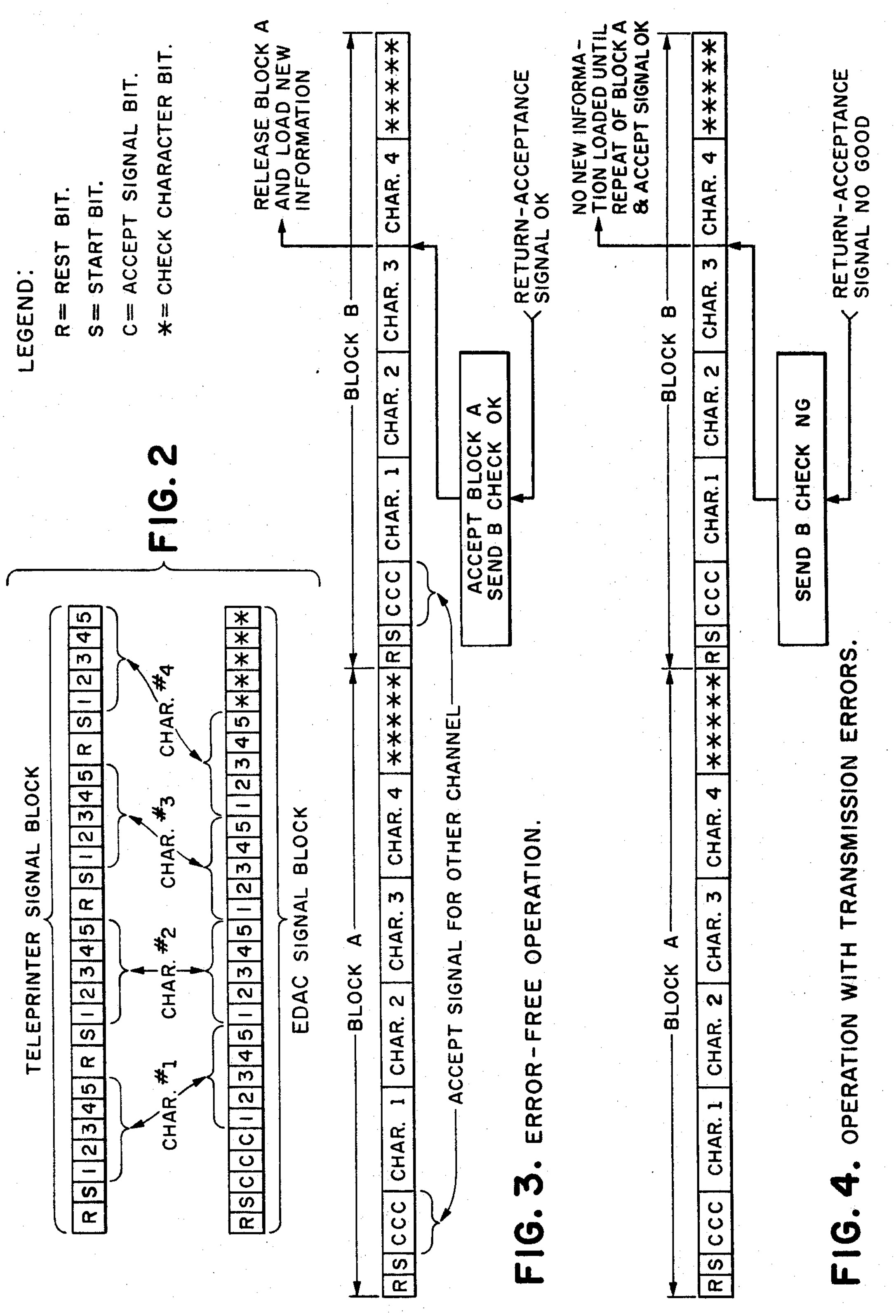
FIGURES 2–4 are graphic diagrams of signal pulse blocks, employed in explaining the invention.

It may be advantageous at this point to compare the EDAC signal block with a teleprinter signal containing exactly the same number of bits to determine how the EDAC system transmits information at the same rate as a standard teleprinter circuit without requiring any increase in the bit rate. FIGURE 2 illustrates this comparison and establishes a relationship between four characters of five bits each of a teleprinter signal block and an EDAC block containing six five-bit groups or characters. Although the EDAC signal contains the same twenty information bits as the teleprinter signal, it also includes five bits designated * * * * * for check information, three bits designated CCC as a return acceptance signal and two synchronization bits R and S. The EDAC system makes it possible to include these ten extra bits and still maintain the same length of signal block as the original teleprinter block. It will be understood that each rest-start bit combination R, S in the teleprinter block occupies two and one-half bits. By deleting the last three of these bit combinations it is possible to save a total of seven and one-half bits. These saved bits are used for the check information and acceptance signal as outlined above. The additional half bit comes from the shortened first rest pulse. Even though the EDAC signal block differs in some respects from the teleprinter signal block the fact that both contain a total of thirty bits makes it possible to transmit the EDAC signal at the same character speed as a standard teleprinter signal without increasing the bit rate.

It is not necessary to convert codes in the EDAC system since it derives its error check information from a weighted binary sum of the information bits contained within each block transmitted. The check is extremely tight in its function and gives equal protection to all bit levels transmitted.

Whenever an error is detected it is not necessary to back up the tape at the sending end to obtain a retransmission of information; nor is it necessary to cancel errored information received at the receiving end. Buffer storage is provided at both sending and receiving terminals making such a procedure unnecessary.

Standard NOR logic circuits are used to provide simple buffer storage. The readout is non-destructive and information may thus be retransmitted from storage as often as desired. At the message receiving terminal only valid blocks of information are delivered from storage for recording resulting in copy that is free from transmission errors.

It is not necessary to halt transmission after every block is sent to confirm its reception. Two buffer storage units at each terminal provide the time overlap necessary to make the operation of EDAC system a continuous function with no halt in transmission except when errors are discovered. An error discovered in one direction does not necessarily halt traffic in the opposite direction during correction procedures.

*Operation without errors*

Under normal operating conditions each EDAC signal block is transmitted in succession with a check character at the end of the block as shown in FIGURE 3.

The sequence of transmission never varies, first block A then block B, followed by another block A and so on indefinitely. An acceptance signal from the receiver terminal accepting the first block A must arrive at the sending terminal before transmission of the check character for block B. The acceptance signal for block A may come at any time during block B permitting the release of block A information from block A sending storage and allowing new information to be stored in block A storage. Likewise the acceptance signal for block B may come back at any time during the transmission of the next block A in sequence. Thus, an acceptance signal received at a sending terminal from the receiver terminal indicates that a block of information has been received correctly, and directs the release of this block from sending storage. At the receiving terminal blocks of information placed in receiving storage that check correctly are delivered as error-free copy to the teleprinter or other readout device.

It will be noted in FIGURE 3 that immediately after block A and its check bits have been sent, the transmission of block B is started without waiting for confirmation of the satisfactory reception of block A. Block A information, however, is not released from sending storage until an acceptance signal is returned from the receiving terminal. The return of an acceptance signal may occur at any point before the check bits of block B are transmitted.

The storage of block A from sending storage is always released at the start of transmission of check bits in block B by the sending terminal no matter when the return-accept signal is received at the sending terminal during transmission of block B. This delayed release is provided for convenience in input timing.

Under "no error" operation traffic will flow continuously in both directions at normal teleprinter speeds with no hesitation between signal blocks. The recorded copy produced by teleprinter will give no indication of EDAC operation under "no error" conditions.

*Operation with transmission errors*

FIGURE 4 shows EDAC operation under conditions in which transmission errors are encountered. No specific reject signal is needed. The absence of a proper acceptance signal, or an error in the acceptance signal is considered a rejection requiring retransmission of the signal block in question.

If a return-accept signal is properly received, it is quite certain that the signal block was also properly received to be delivered at the receiving terminal as error-free copy.

If no return-accept signal is received, it is certain that the signal block was not correctly received.

If, for instance, block A was received in error, correction is simple. Since the receiving terminal will not deliver block A nor the following block B, then block B transmission may be concluded without any possibility of delivery to the teleprinter at the receiving terminal. Block A may then be retransmitted and if correctly received, delivered at the receiving terminal.

If, however, block A was correctly received but the return-accept signal for block A was errored, it is necessary to prevent block B from being delivered at the receiving terminal since retransmission of block A is indicated as being necessary. This is accomplished by erroring the check information in block B. Blocks A and B may then be repeated in this pattern until proper acceptance of block A is obtained.

The EDAC operation therefore, is controlled by only one signal. Every block may be accepted individually and in sequence before new information can be set up for transmission.

It will be understood that when errors are introduced into the transmitted signal, there are two ways in which an acceptance signal may not be received and consequently will require a retransmission of a block from the sending terminal:

(1) The received information does not correspond to the transmitted information, in which case delivery to the teleprinter does not take place, and (2) An improper or incorrect acceptance signal arrives at the sending terminal for a block of information that has been received and delivered correctly. Here the acceptance signal itself contains a error.

To examine the latter situation in more detail, refer to FIGURE 4. Suppose that block A is transmitted and received correctly but the return acceptance signal become mutilated in some manner. Since block A was received correctly at the receiving terminal it will be printed out and the receiving terminal will be set to deliver and print block B. At the sending terminal, on the other hand, the wrong acceptance signal for block A results in a transmission of a purposely errored check character for block B so that delivery of this block B to the teleprinter will be rejected by the receiving terminal. Both block A and B will be retransmitted until a proper acceptance signal verifies an error-free reception for block A. After proper acceptance signal arrives for block A, the check character for block B will be sent out correctly. For numerous retransmissions the check character for the block following an errored block will always be transmitted as a false check until an acceptance signal returns correctly. This procedure prevents signal blocks from being delivered out of sequence at the receiving terminal.

A similar situation exists when block A is errored in the transmission medium and the receiving terminal detects the errored block. This time the receiving terminal itself supplies a false signal and affects a retransmission of block A. Once again, the sending terminal follows the prescribed pattern and deliberately errors the check character for block B. Then, the sending terminal transmits both blocks over again. Strict adherence to the pattern of erroring the check character of block B and retransmitting both block A and B for every false acceptance signal establishes a simple and efficient sequence for this error detection and correction data transmission system.

The above discussion always assumes an error falling within block A. It may just as well have fallen into block B since error generation is a random process. If this be the case, then, the preceding explanation still applies, with the block A following the errored block B, subject to deliberate erroring and retransmission.

FIGURES 5A–5D taken together as shown in FIGURE 5, constitute a block diagram of an EDAC communications system in which terminal I is shown in FIGS. 5A, 5B and terminal II is shown in FIGS. 5C, 5D. Terminal I is designated the master EDAC sending terminal. Its oscillator 282 determines the timing of the system. Terminal II is designated the slave EDAC receiving terminal and its oscillator 282' is synchronized with oscillator 282. It will be noted that both terminals are identical and have similar components. The components of terminal II are assigned primed numbers which are identical to those of corresponding components of terminal I. For purposes of explanation it will be assumed that terminal I is sending EDAC signals to terminal II via radio transmission medium or path RP and terminal II is sending EDAC signals to terminal I via the same transmission medium. The two signals are the same in character except for one modification in the signal sent by slave terminal II; see FIGURES 7A, 7B.

Starting at the master sending terminal I shown in FIGURE 5A, the input of data to be transmitted is obtained from punched tape 20 passing through tape reader 14 under the direction of load control circuit 22 to read the data into block A and block B storage matrices 23, 24.

The load control 22 determines whether new data is to be stored and transmitted or if the last stored data is to be re-transmitted to correct an error. It is directed by accept-read circuit 34 which generates an appropriate signal upon receipt by receiver 15 of the returned accept-reject signal from terminal II.

The EDAC signal is encoded by sending distributor 25 into blocks of information of fixed length as indicated in FIGURE 2. The EDAC signal block A will contain data bits from block A storage 23, check bits for the data, control bits and synchronization bits. The sending storage facility is composed of two similar storage matrices 23, 24. This storage facility permits the blocks of data to be transmitted in alternating sequence: block A, block B, block A', Block B', etc., see FIGURE 6.

Included in each EDAC signal block is the final check character (* * * * *) which is generated by sending computer counter 26. This check character is the weighted binary sum of information bits contained within each transmitted signal block. It is added at slave receiver terminal II with the complement of a similar locally generated check character obtained from the incoming information bits. The correct summation of the two check characters confirms reception of error-free data.

Also included in the block of data to be sent by the master sending terminal I is an accept-reject signal for confirmation of signal data last sent by the slave terminal II.

The transmitted blocks of data are received at the slave receiver 15', and passed on to pulse read circuit 28' which decodes and distributes the components of the EDAC signal. The incoming bits of data are read into block A or block B receiving storage matrices 29', 30' and also into receiving computer counter 32'. The check character in each block and the accept-reject signal are read directly into the receiving computer counter 32'. The accept-reject signal is also read into acceptance read circuit 34'. The computer counter 32' then sums up the locally generated and incoming check characters. This addition determines whether the information has been received correctly. In order to provide the time needed for the incoming data to be checked for errors, the data signals are read into temporary storage in sending storage matrices 23 and 24. There the data waits for the computer counter 32' to generate a signal which instructs delivery control 36' as to whether or not it should read the data out of storage 29, 30. This signal is also sent to acceptance control circuit 38' and acceptance distributor 31'. This distributor then generates an accept or reject signal, as may be appropriate, for reporting the condition of the received data. The accept or reject signal is then sent by slave transmitter 18'. When the signal arrives at the master receiver 12 it is directed to acceptance read circuit 34. The general makeup of the information blocks and their relative time positions as they are transmitted in each direction between the master and slave terminals of FIGURES 5A–5D is depicted in FIGURES 6, 7A and 7B.

The retention of the transmitted signal block temporarily in storage matrices 23, 24 eliminates the need to back up the tape 20 for retransmission of errored data. The storage also eliminates the need to stop transmitting in order to confirm reception of transmitted data. This continuous transmission is made possible because of the two-part subdivision of the storage. This two-part storage enables the EDAC systems to transmit continuously signals consisting of blocks of data which are alternately obtained from the individual sub-storages. For example, signal block A is first transmitted. Immediately after block A is sent, transmission of block B begins. While block B is being transmitted, block A is confirmed at slave terminal II and an accept or reject signal is returned. Thus, some of the time used to confirm reception of block A is also being used to send block B. In like manner, when block B is being confirmed, the next block A is being transmitted.

When transmitting data under conditions where errors are introduced, the EDAC operation entails retransmission of both the errored block and the block immediately following it. The following explanation will describe the steps followed by the master EDAC terminal I in sending data to the slave EDAC terminal II under these conditions. This same description also holds true for data being sent in the opposite direction.

The master transmitter 18 first sends block A from storage 23 to the slave receiver 15'. Block B is immediately transmitted after block A. At the slave terminal II the data of block A is read into the storage 29' and into the computer counter 32'. The computer counter 32' generates a check character which is added with the incoming check character in signal block A. If the check characters do not add correctly due to the presence of errors, counter 32' generates a rejection signal. This signal instructs the local delivery control 36' not to release the data from storage 29' to the teleprinter 16'. This signal also causes the acceptance distributor 38' to generate a reject signal to be transmitted by the slave transmitter 18' as a part of the block currently being transmitted from slave terminal II to master terminal I. Receipt of this reject signal at the master receiver 12 instructs accept generator 34 to generate a signal which directs load control 22 not to erase block A storage in matrix 23. This signal will also deliberately error the computer check character for signal block B. By this expedient, reception of block B before block A has been correctly received, is prevented. Block B storage in matrix 24 will not be erased because block B was not accepted due to the errored check signal. Thus retransmission of both signal blocks results. Meanwhile, at the slave terminal II the storage of both blocks is being erased at storage matrices 29', 30' in sequence in order to accommodate the retransmitted data. These erasures are accomplished by a periodically timed signal obtained from the receiving distributor counter 256'. When block A is finally accepted, new data is sent from storage A 23 immediately after block B has been transmitted and the above procedure is repeated.

It was stated above that the data in the storages 29, 30 of the receiving terminal must be erased in order to permit new or retransmitted data to be received. These erasures occur after a block of data is check for errors and is read out by the delivery control 36' in case no errors are present. The periodically timed pulse will erase the storage just before the new data is received for storage.

For the transmission of data under error-free conditions, continuous transmission of data in both directions results. For example, the sending terminal I sends block A, immediately followed by block B. With no errors introduced into the data, block A is accepted by receiving slave terminal II and an acceptance signal is generated by counter 32'. This signal instructs the delivery control 36' to release signal block A. It is also applied to the acceptance distributor 31' which generates an acceptance signal to be transmitted by the transmitter 18'. Upon receipt of this acceptance signal at the master receiver 15 the acceptance read circuit 34 directs load control 22 to erase the stored block A in matrix 23 and to load the matrix with another signal block. The check character for block B is unaffected. During the confirmation of block A and the reloading of sending storage A at the master sending terminal, block B was being transmitted and block A storage at the slave receiving terminal matrix 29 was released. Thus block B is subjected to the same operations as block A; and while the acceptance signal for block B is being returned, the new data in block A 23 is being transmitted. The above procedure is repeated, only now block B is to be confirmed and block B storage 24 is to be reloaded with new data.

There are two conditions which may cause a reject signal to be returned. The first is reception of data errored during transmission. This prevents correct summation of the two check characters. The procedures are fully described above. The second is reception of data correctly, but upon return transmission the accept signal was errored thus producing a reject signal.

When the second situation is encountered, the data of the block is caused to be printed out in teleprinter 16' by the delivery control 36'. If the block just printed out was block A, the delivery control 36' sets itself to deliver block B. However, this block of data will not be delivered because its check character was deliberately errored before it was transmitted, thus preventing correct addition at the receiving end. The delivery control 36' remains set to deliver block B in order to prevent block A from being printed out again. Retransmission of both blocks continues from terminal I, with both blocks being retained in master EDAC transmitter storage 23, 24 until proper acceptance signal for block A is received at the master terminal I. Then new data is stored in block A storage 23 and the check character for block B is unaffected. If block B is received correctly, the delivery control 36' will then deliver block B to teleprinter 16' and reset itself to deliver block A.

It should be noted that in the absence of errors, transmission proceeds without interruption in both directions simultaneously. The only penalty imposed on transmission time is the requirement for inclusion in each block of a set of check bits and an accept-reject character. This remains true when data is errored but additional time is, of course, consumed by the necessary retransmissions. This remains true even when a returning acceptance signal is errored during transmission but the retransmission must include both blocks repetitively until the first block is correctly received. Therefore, at no time is either direction of transmission idle, and all transmissions are purposeful.

The two storage matrices 23, 24 of sending terminal I which store information prior to transmission, each have a storage capacity of four characters, five bits in length for a total of twenty bits per bank. This enables continuous operation of the system without hesitation in transmission except in the presence of errors. We shall examine the storing process in more detail. The tape reader 14 reads four characters into block A23 and thereafter during transmission the computer 26 samples the contents of this storage. It assigns a weighted binary number to each bit in storage and obtains a binary sum of these four characters. Upon transmission of the four characters the five bits developed from the summation process serve as the check character for this block. Subsequently the tape reader 14 loads four new characters into block B storage 24 and the binary sum of these characters is obtained by the computer 26. Depending on whether the acceptance signal for block A returns correctly or incorrectly the computer counter 26 inserts a true binary sum or a series of five space bits for the check character. If an incorrect acceptance signal arrives from the receiving terminal II the computer counter 26 purposely errors the check character with five space bits and this indicates to the receiving terminal the unacceptable status of block B. These circumstances call for a repetition of transmission both block A and block B. The non-destructive readout characteristic of the storage banks 23, 24 allows signal block A and block B to be repeated as often as necessary.

The check character is used to perform one of the most important functions of the system. The correction function in the EDAC system is performed by repeating a block of four characters until they are received correctly and the reception acknowledged. Thus, it is not necessarily to know where an error has taken place but only that an error or number of errors has taken place in a specific signal block. The EDAC block allows five bits for error detection redundancy.

After every block where the receiving computer counter 32' has given the correct sum, the information is read out from storage 29' or 30' and delivered as error-free copy. In the readout process the delivery control 36'' inserts the rest and start bits R, S for each character which, in effect, recreates the original teleprinter signal for use with teleprinter 16'.

Under some circumstances it is possible for a block of information to be transmitted correctly more than once when a return acceptance signal itself becomes errored in transmission. In order to circumvent the possibility of a double delivery, the delivery control circuit 36' remembers the sequence of delivery, first block A, followed by block B, etc. Thus, a delivery of block A causes the delivery control 36' to anticipate block B. If block A happens to be repeated, it will not be printed out the second time because the delivery control is waiting for block B. The delivery control accomplishes the following functions: (1) it stops delivery in case of an error in the information and (2) it keeps track of the block sequence. The latter function adds further assurance of printing out blocks in correct sequence.

A more detailed description will now be presented of the operation of the system with particular reference to FIGURES 5–9.

FIGURES 7A, 7B show the successive timing bits of successive signal blocks A and B as sent by a master terminal I to a slave terminal II. The four message data characters 1A–4A and 1B to 4B in the A and B blocks have timing bit sequences or groups designated respectively U, V, W, X. In the Y timing bit group occur five bits designated * * * * * and representing the check character. In timing bit group Z occur the rest-start synchronizing pulses R, S and the three bits CCC representing the returning accept-reject signal for data last sent by terminal II.

FIGURES 8A–8F taken together show parts of terminal I arranged as a master terminal, while FIGURES 9A–9G taken together show parts of terminal II arranged as a slave terminal, all in accord with FIGURES 1 and 5A–5D. Corresponding components of terminals I and II are identically numbered, except that the numbers of circuit components in terminal II are primed. For the sake of brevity certain circuit components or blocks are described only once as they are used at either terminal I or terminal II. It will be understood that the corresponding circuit component or block in the other terminal is arranged and used in the identical way.

*Basic circuits*

In the following detailed description of the system, certain basic circuits including gates, flip-flops, and emitter followers are used. These may be transistorized circuits of conventional types mounted in groups on cards in a known manner. For completeness, a number of these circuits are shown. The basic circuits are shown symbolically by triangles or rectangles in the logic diagrams of FIGURES 8 and 9. Exemplary circuits represented by these symbols are shown in FIGURES 10–13.

In FIGURES 10 and 11 are shown two-input and three-input NOR gate circuits G1 and G2 respectively. For the two-input gate G1 when neither input 302 nor input 304 is negative, the output 306 is negative. For the three-input gate G2 when neither input 307, nor input 308, nor input 309 is negative, the output 310 is negative. By connecting two gates back-to-back a D.C. triggered flip-flop can be formed. Gate G1 has input resistors 303, 311 and a transistor 312 which serves as an inverting amplifier. Gate G2 has input resistors 313–315 and a transistor 316 which serves as an inserting amplifier. The gates can perform OR circuit logic for negative inputs and AND circuit logic for ground inputs. Since the transistors invert and amplify the input signals they can drive other NOR gates.

In FIGURE 12 is shown a type of flip-flop circuit FF such as may be used as a basic logic element in the EDAC system. It is used as a binary counter or storage element. The basic flip-flop includes two transistors Q1, Q2 and resistors R1–R6. The triggering circuitry includes capacitors C1–C3, diodes CR1–Cr5 and resistors R4–R13. The circuit can be in one of two distinct stable states: the set state or the reset state. The reset state is defined as the condition in which transistor Q1 is fully on, its collector then being at ground potential, with transistor Q2 is off with its collector at negative potential. In the set state the opposite is true; i.e., transistor Q2 is fully on and transistor Q1 is fully off. The triggering circuitry is used as to change the state of the flip-flop. There are four independent triggering networks, three of which can be used to reset and one to set the flip-flop. Terminal 4R is an A.C. reset terminal. Application of a positive going pulse at this terminal will cause the circuit to go to the reset state as the pedestal resistor is always at ground. A positive going trigger at terminal 1R will reset the flip-flop provided terminal 3R is at ground. A positive trigger at terminal 1S will set the flip-flop provided terminal 3S is at ground. Terminals FFR and FFS are the output terminals of the flip-flop.

FIGURE 13 shows the circuit of an emitter follower EF such as may be used in the EDAC system. The emitter follower includes resistors 370 and 372 and one transistor 373. The emitter follower has the characteristic that the output signal follows the input signal with a current gain but with no signal inversion. It has a high input impedance and presents a low output impedance to a negative going load. It may be used as a driving stage between the output of a NOR gate of flip-flop and its load.

*Loading information from tape*

The block A sending storage matrix 23 at terminal I is loaded into and transmitted from during time block A; see FIGURES 5, 6, 7A, 8A. The block B sending storage matrix 24 is loaded into and transmitted from during time block B.

Tape reader or transmitter 14 is stepped four times per signal block by tape step drive 202 during the second and third time sections V, W of the U, V, W and X time groups; see FIGURE 7. During time block A, four transmittter step pulses are produced by three ground inputs to gate 28–A of tape step drive 202. These inputs are designated "A," "STEP" and "LOAD A." During time block B four transmitter step pulses are produced by three ground inputs to gate 28–10 of the tape step drive. They are designated "B," "STEP" and "LOAD B." Gate 28–4 acts as an inverter for gate 28–1 so that a negative pulse will be obtained at the output of gate 28–4 for each transmitter step pulse. This negative pulse is applied to power amplifier 204 whose output conducts to ground when a negative pulse is applied to its input. The output of gate 28–4 is also applied to gate 28–H which conducts and acts as a drive to energize transmitter polar relay 206. The energized polar relay closes its contacts 206T and 206M and applies a ground wire 208. It is seen that when a transmitter step pulse occurs, a ground is placed on wire 208 through the contacts 206T, 206M. This ground is applied to the coil of tape transmitter step magnet 210 so that current will flow from ground through the step magnet and battery resistors 212 and 214 to negative 120 volts.

The five sensing pins 1M, 2M, 3M, 4M, 5M of the tape transmitter 14 are connected to the read-in circuits of the block A and block B storage matrices 23, 24. The first sensing pin 1M is connected to eight first level storage cells, four first level cells in each matrix. The second sensing pin 2M is connected to eight second level storage cells, four in each matrix, etc. For example, the first sensing pin 1M is connected to read-in gate 1–H and similar gates in storage blocks 2A, 3A, 4A, in matrix SMA, and storage 1B, 2B, 3B and 4B in matrix 24. The second sensing pin 2M is applied to read-in gate 2–H and similar gates in storage 2A, 3A, 4A, 1B–4B.

To see how a bit is read into sending storage, let us look at the storage for the first bit of the first character "1A" of four characters in block A storage 23. The five bits of character 1A are stored in the group of gates labeled "Storage 1A" in matrix 23. The storage gates for the first bit of character 1A consist of gates 1–H, 2–10, 2–A and 1–7. Gates 2–10 and 2–A are connected back to back to form a D.C. flip-flop which stores the information as to whether the bit is a mark or a space. Before information is read into storage flip-flops it is reset so that it has a space in storage. This spacing condition is obtained when the output of gate 2–10 is negative and the ouput of gate 2–A is ground. The storage reset pulse for block A storage is obtained during character times "2" and "3," of timing group Z in block B; see FIGURES 7A, 7B. This reset pulse is produced by three ground inputs designated "MZ," "STEP" and "LOAD A" to gate 69–10 in reset storage 216. The negative output of gate 69–10 is amplified by emitter follower 67–D and is applied to all the storage flip-flops in block A storage 23 to reset them to spacing condition.

Gate 1-H in storage 23 is used to read in a mark to the storage flip-flop of bit "1" of character 1A. There are two inputs to gate 1-H. One input is from the first sensing pin 1M of the tape transmitter 14. This input is negative when the pin is down and senses a space and is ground when the pin is up and senses a mark. The other input is a timing pulse from gate 1—1 in read in-read out control 354 for black A. This timing pulse is a ground during character time "5" of timing group Z in block A. The first input tells whether or not to read in a mark and the other input tells when to read in the mark. When a mark is read in the output of gate 1-H will be negative and will be applied to gate 2—10 to make its output negative and thereby make the output of gate 2-A ground. The flip-flop 2–A, 2–10 will now remain in its condition of storing a mark until it is reset again later on. The read in timing pulse from gate 1—1 was obtained by three grounds applied to gate 1–10, designated "MZ," "5," and "LOAD A". This produced a negative output which in turn was applied to inverter gate 1—1 which produced the required ground output.

The ground output of gate 1—1 is applied to all five storage flip-flops 2–A, 2–10; 2–1, 2–4; 3–10, 3–A; 4–10, 4–A; 4—4, 4–7 in storage 1A of matrix 23, for the five bits of character 1A. This is because all five levels of each character in the tape are read into storage at the same time.

If there is a space in the tape on the first level, the storage flip-flops remain in the reset condition. Only a mark will change the condition of the storage flip-flops.

The information in storage 23 is read out and transmitted during the time group following the time group in which it is read in. In our example, the first character 1A of block A was read in during the Z time group of block A; it will be read out and transmitted during the succeeding U time group. Read out control gate 1–4 has two ground inputs designated "MU" and "A," which produce an negative pulse which is then inverted by gate 1–A producing a ground pulse which is applied to five read-out gates of storage 1A. The first read-out gate 1–7 reads out level "1" of character 1–A. A mark will read out if the two inputs to gate 1–7 are ground. One output will be a ground if there is a mark in the storage flip-flop, i.e., gate 2–10 is a ground. The other input is the read-out timing pulse from gate 1–A. The output of gate 1–7 will be negative when a mark is read out. All of the marks which are in storage 1A will be read out at the same time and applied to the sending distributor 25.

Sending distributor 25 has five input gates each of which consist of three parallel "NOR" gates to obtain eight inputs to each input gate. The first of the five input gates consist of combining gates 18–10, 18–A and 18–7 in combining gate group 218. The eight inputs come from the first level of gates in Storage 1A, 2A, 3A, 4A of matrix 23 and in storage 1B, 2B, 3B and 4B of matrix 24. The input to the other four input gates come from the corresponding levels in the storage matrices 23, 24. These input gates are gates 19–10, 19–A, 19–7, 20–10, 20–A, 20–7, 21–10, 21–A, 21–7, 22–10, 22–A, 22–7. The input gates act as "OR" gates with negative marking inputs. The output of the first input gate will be ground whenever a negative or marking pulse is read out of any one of the first level storage flip-flops. In a like manner the output of the second input gate will be ground whenever a marking pulse is read out of any one of the second level storage flip-flops.

Only one character at a time is applied to the sending distributor 25 but all five bits of each character are applied at the same time. To distribute these five bits in time sequence for transmission to the output line 220 the marking ground outputs of the five input gates are combined with the corresponding five time sections of each time group. Therefore, when the first level or bit of a character is read out as a mark, and ground appears at gate 18-A, then when it is applied together with a ground from time "1" at the input to gate 18–4, the output of gate 18–4 will be negative. In the same way, when level "2" in storage matrix 23 or 24 is read out as a mark and time "2" is applied to gate 19–4 in the sending distributor 25 then a negative pulse will appear at the output of gate 19–4. These negative marking outputs at gates 18–4, 19–4, 20–4, 21–4, and 22–4 (five negative marking pulses in time sequence) are combined by gates 18–H and 19–H and the output of these two paralleled gates is a ground whenever a mark is transmitted out of storage. This ground is inverted by gate 21–H in output relay drive 222. The ground is then applied to gate 22–H which causes the tongue 224T of the sending polar relay 224 to move to the marking side at contact 224M. With a space of negative signal as the output of gates 18–H and 19–H, gate 20–H inverts the signal and causes the tongue 224T of the sending polar relay to move to the spacing side at contact 224S. The contacts of the relay are then used to modulate the transmission medium. Block A storage characters 1A, 2A, 3A and 4A are therefore read into storage during the fifth section of time groups Z, U, V and W respectively and are read out of storage during the time groups U, V, W and X respectively. The same thing happens to block B storage characters but in the next time block.

*Sending computer*

The check signal, which consists of the weighted binary sum of the marking bits in the twenty information bits which comprise the four characters in each block, is transmitted during the time group Y. As the four characters are transmitted to the sending line 220 during the U, V, W and Y groups they are simultaneously applied to the sending computer counter 26 which comprises flip-flops 77–1, 77–7, 78–1, 78–7 and 79–1. Each marking bit which is sent from the first or fourth levels of storage is given a binary weight of one and adds a count of one to the sending computer counter 26. This is accomplished by applying the first and fourth level negative marking signals from gates 18–4 and 21–4 to gates 76–10 in the counter where they are combined. The output of gate 76–10 is then applied to the first flip-flop 77–1 of the computer counter where the count of one is added for each first or fourth level bit transmitted. Each marking bit which is sent from the second or fifth levels of storage is given a binary weight of two and adds a count of two to the sending computer counter. This is accomplished by applying the second and fifth level marking signals from gates 19–4 and 22–4 to gate 76–A where they are combined. The output of gate 76–A is then applied to the second flip-flop 77–7 of the computer counter where a count of two is added for each second or fifth pulse transmitted. Each marking bit which is sent from the third level of storage is given a binary weight of four and adds a count of four to the sending computer counter 26. This is accomplished by applying the third level negative marking pulse from gate 20–4 to gate 76–H and applying the ground output from gate 76–H to the third flip-flop 78–1 of the computer counter where a count of four is added for each third pulse transmitted. Note that the second and third flip-flops 77–7, 78–1 each have two inputs; one for reading in the transmitted signals and one receiving a count from the preceding flip-flop. The five flip-flops will provide a count of thirty-two. If all twenty information bits read out of storage were marking, a maximum count of forty would be added to the counter. This means that total counts of 33 through 40 will be the same as counts 1 through 8 on the counter.

The five computer counter flip-flops each have their reset side output applied to the sending computer computing distributor 226 which reads out serially to the line 220 the five bit count stored in the computer counter 26.

*Sending computer distributor*

The five flip-flops of computer counter 26 are connected to inputs of gates 50–10, 50–A, 50–1, 50–4 and 50–7 respectively in the sending counter distributor 226. Timing pulses "1" through "5" are also applied to these gates respectively from timing gates 88–2, 88–4, 88–7, 87–1, 87–4 via emitter followers 83 in the sending distributor gate group 228. Since the reset side of the computer counter 26 is used as its output, a count of one on a flip-flop will be read out as a 0 or space or the sending line 220. For example a binary count of 10101 on the counter will be read out by the sending computer distributor 226 to the line 220 as 01010 where binary "1" represents a mark and binary "0" a space. The output of the five gates mentioned above will be negative or marking when a 0 is stored on the counter flip-flop and the corresponding timing gate pulse is applied. The negative marking outputs of gates 50–10, 50–A, 50–1, 50–4 and 50–7 are applied to paralleled gates 50–H and 51–H whose output is then a ground for each marking pulse. The marking ground output of these two gates is then applied to gate 51–A. Time group Y from timing gate 86–1 is applied to gate 51–A which allows the marking pulses to be read out of the computer counter 26 through this gate only during time group Y. The output of gate 51–A is negative for a mark and is applied to gate 51–7 which combines this check signal with the rest of the EDAC signal for transmission to the line 220.

Note that the computer control signal coming from computer control 230 is applied to gate 51–A. This signal is normally a ground and will have no effect on the computer distributor 226 during normal transmission of the check signal. If, however, it is required to intentionally error the check signal, then the computer control signal is made negative and inhibits the reading out of the computer storage to the sending line 220. This negative signal causes the output of gate 51–A to be ground, which is a spacing condition, during time group Y. An intentionally errored check signal always consists of five spacing bits during the time group in which the check signal is sent. Five spacing bits can not be sent to the line during the check signal group under normal conditions because this would require that the computer counter total be 31 or binary 11111. This condition is made to be impossible by reading this condition if it ever occurs and immediately adding a count of one to the first computer counter flip-flop 77–1. This is done by parallel gates 75–4 and 75–A. The inputs to these gates are all ground when counter sum 11111 occurs and its output becomes negative and resets the first flip-flop to the reset or 0 condition. This adds a count of one to the computer counter sum so that the count goes from 31 to 32 automatically. The computer counter 26 is reset at time "1" in timing group U which is after the counter has been read to the line 220 but before any new bits are applied to the counter.

*Sending acceptance*

The acceptance signal consists of five bits and is transmitted during time group Z. The first bit is the rest portion R of the EDAC signal and is produced by gate 49–1 in acceptance distributor 31. Gate 49–1 has a negative marking output when the two grounds consisting of timing group Z and time section "1" are applied to its input. Timing group 2 is applied from timing gate 86–4 and time section "1" is applied from timing gate 88–2. The rest bit R is therefore always a mark. The second bit is the start portion of the EDAC signal and is always a space. The space does have to be generated because the absence of the generation of a marking signal during time "2" in timing group Z results in a space during that time. Under normal operation the third and fifth bits are marking and the fourth bit is spacing. When the acceptance signal is to be intentionally errored the third and fifth bits are sent out as spaces and the fourth bit is marking. Under normal conditions a ground will be applied from gate 48–1 of acceptance control 38 to gates 49–10 and 49–H. Gates 49–10 and 49–H will then send out the third and fifth marking pulses in the same manner as gate 49–1 sent out the first or rest pulse. Gate 48–4 of acceptance control 38 applies a negative signal to gate 49–A and inhibits a mark from being sent out from this gate during the fourth time section. The fourth pulse is therefore a space. When the acceptance signal is to be errored, gate 48–1 has a negative output and inhibits gates 49–10 and 49–H thereby sending out a space for the third and fifth bits. Gate 48–4 is a ground and allows the fourth bit to be a mark. The output of the acceptance control 38 is provided by outputs of a flip-flop comprised of back-to-back NOR gates 48–4 and 48–1. This output controls whether a good or errored acceptance signal is transmitted. The acceptance control flip-flop 48–1, 48–4 is reset during every block by a negative signal during time "1" of timing group U so that an errored acceptance signal will be transmitted unless the flip-flop is set by a negative computer check pulse received from the receiving terminal II of the EDAC system before the acceptance signal is transmitted. The negative marking outputs of gates 49–1, 49–10, 49–A and 49–H are combined by parallel gates 49–7 and 48–7 which in turn combines the acceptance signal with the rest of the EDAC signals.

*Receiving signals and reading information into storage*

Referring to FIGURES 5A–5D and 9A–9G the EDAC signal is applied to receiving polar relay 250′ which follows the line signals. The relay contacts 250T and 250M close when a mark is received and apply a ground to the output of gate 121–4 in an anti-bounce network 252′. Gate 121–4 is part of anti-bounce flip-flop 121–4, 121–7 comprised of back-to-back NOR gates 121–4 and 121–7. When a space is received, relay contacts 250T and 250S close and a ground is applied to the output of gate 121–7. The flip-flop follows the line signals but does not respond to any bounce in the relay contacts. The two outputs of the flip-flop are amplified by emitter followers 123–H and 123–K. The output of emitter follower 123–H will be ground when a mark is received. The output of emitter follower 123–K will be ground when a space is received. The idle condition of the EDAC signal will be a steady mark. The first pulse to be received and recognized is the start pulse S; see FIGURE 7A. When the start pulse is received and the line goes spacing, the input to gate 99–4 in receiving counter control 254′ from emitter follower gate 123–H will become negative. This negative pulse will reverse the state of the flip-flop consisting of gates 99–4 and 99–1. The output of gate 99–4 will become ground and allow the receiving distributor counter 256′ to start. The receiving distributor counter starts in approximately the middle of the first time section of the Y timing group which corresponds to the middle of the receiving distributor counter's rest pulse. Therefore the receiving distributor counter's start pulse does not begin until the middle of the received start pulse and the beginning of all the receiving distributor bits occurs in the middle of the corresponding bit of the received EDAC signal. A read-to-storage pulse is produced at gate 134–4 in the receiving distributor gates 350′. This pulse is a ground that occurs at the first one-sixth of each receiving distributor bit or time section. This read-to-storage pulse therefore occurs approximately in the middle of each bit of the incoming EDAC signal. This pulse is used to sample or read the middle of the incoming EDAC signal as to whether the bits being received are marking or spacing. This is done by the pulse reader circuits 28′. The mark output of emitter follower gate 123–H in network 252′, which is a ground when the incoming signal is a mark, and the read-to-storage pulses are applied to gates 122–10, 122–A, 122–H, 121–10 and 121–A in the pulse reader 28′. Ground time pulses "1," "2," "3," "4," and "5" respectively are also applied to the above gates from receiving distributor gates 135–1, 135–4, 135–7, 136–1, 136–4. Gate 122–10 therefore produces a negative pulse whenever the first bit of each received character is a mark. The other four gates in the pulse reader 28′ produce negative pulses whenever the second, third, fourth or fifth received bits are marking. The outputs of these gates are then inverted by gates 122–1, 122–4, 122–7, 121–H and 121–L and amplified by emitter followers 123–B, 123–C, 123–D, 123–E and 123–F to produce ground pulses when marks are received. The ground outputs of the emitter followers are labeled 1M, 2M, 3M, 4M, and 5M and in FIGURE 9E correspond to first, second, third, fourth and fifth marking pulses. In the same manner as the sensing pins of the tape transmitter or reader 14 applied pulses to their corresponding levels of all eight storage levels in the sending storage matrices 23, 24, the outputs of the emitter followers 123–B to 123–F are applied to their corresponding levels in all eight storage levels in the receiving storage 29′, 30′. The circuitry used to read in information to storage and read out information from storage is the same for the receiving storage matrices 29′, 30′ as for sending storage matrices 23, 24, but the timing is different. Taking storage character 1A as an example, the read in timing pulse which is applied to read in gates 151–A, 152–1, 153–7, 153–A and 154–1 occurs during time U of block A. This read in timing pulse lasts for the whole U instead of just one-fifth of the timing group as in the sending EDAC terminal I. This is because the ground marking pulses for the individual storage levels 1M, 2M, 3M, 4M and 5M do not all occur at the same time as they did on the sending side, but occur one after the other for each of the five sections of the time U. The read in time pulse is produced by two grounds A and U applied at the input of gate 151–1 from emitter follower 140–11 and gate 136–7. This produces a negative output which is inverted by gate 151–H to produce the timing ground pulse. Characters 1A, 2A, 3A, 4A, 1B, 2B, 3B and 4B are read into storage at times U, V, W, X of block A and U, V, W and X of the block B respectively. The negative output of the gate 151–1 is also applied to readout timing gate 151–4 in the read in-read out control 352′. Gate 151–4 produces a ground read out pulse which is applied to emitter follower amplifier gate 126–D and then applied to readout gates 151–10, 152–A, 153–H, 153–10 and 154–10. The character is therefore read out of storage at the same time that it is read into storage. This readout is the first of two readouts which occur from this storage. This first readout is used to read these received marking pulses into the receiving computer counter 32′. The five negative outputs of the receiving storage 1A readout gates are applied to five input gates 168–10, 168–H, 168–4, 169–H, 169–4 of the block A combining gates 260′. The five combining gates are each comprised of two NOR gates in parallel so that they may have four inputs, one from each of the four storage characters 1A, 2A, 3A and 4A in block A storage matrix 29′. The other NOR gates are gates 168–A, 168–1, 168–7, 169–1, 169–7.

The five pairs of combining gates have their inputs corresponding to the five levels of storage of each of the four storage characters 1A, 2A, 3A, 4A. The negative inputs to the combining gates produce ground outputs whenever a mark is read out of that particular level of storage. For instance, when a mark is read out of level one of storage 1A in matrix 29′ the negative output of gate 151–10 is applied to the level one combining gate consisting of paralleled gates 168–10 and 168–A. The output of this combining gate is then a ground. The five outputs of the combining gates 260′ are each applied to the computer input distributor 262′ and the delivery distributor 264′. The computer input distributor 262′ is timed so that it has an output to the receiving computer 32′ only during the time of the first readout block A storage 29′. The delivery distributor 264′ is timed so that it has an output from block A storage on the second readout from block A storage 29′. On the first readout of the block A storage the computer input distributor 262′ produces timed reading pulses similar to the read-to-storage pulses which are applied to gates 169–10, 169–A, 170–10, 170–A and 170–H. The five outputs of the block A combining gates 260′ and the five corresponding time section pulses "1," "2," "3," "4," "5" are applied to the computer input distributor gates along with the above mentioned timing pulse. This causes gate 169–10 to produce a negative output pulse every time a mark is read into level one and read out for the first time. The other four gates produce negative output pulses when the other four surrounding levels of block A storage 29′ have a mark read in. The timing pulse which is applied to the gate of computer input distributor 262' is produced by two grounds applied to gate 170–4 from emitter follower 140–11 and gate 134–7 and by two negative inhibit signals from gates 138–10, 138–A applied to paralleled gate 170–7. The ground inputs are designated "read to compute" and "A." The inhibit inputs are negative Y and Z time pulses. Gate 170–7 has negative output pulses only during the U, V, W and X time groups of block A. These pulses are inverted by gate 170–1, and the ground pulses are applied to the other gates the computer input distributor 262'.

The five negative outputs A1, A2, A3, A4, A5 of the block A computer input distributor 262' are applied to the input of the receiving computer counter 32'. As in the sending computer counter 26, the first and fourth marking pulse of each character A1 and A4, are given a weight of one. Charatcer pulses A1 and A4 are applied to gate 172–A which has a ground pulse output and is applied to the first flip-flop 176–1 of the receiving computer counter 32'. The second and fifth marking pulses A2 and A5 are applied to gate 172–H which has a ground output and is applied to the second flip-flop 176–A of the counter for a weight of two. The third marking pulses A3 are applied to gate 173–H which has a ground output and is applied to the third flip-flop 177–3 of the counter for a weight of four. At the end of time group X and after all the bits have been read into block A storage matrix 29', the weight binary sum of the marking bits will be in the receiving computer counter 32'. Under normal transmission conditions this binary sum will be the same as that in the sending computer counter 26. If it is not, then there has been a transmission error caused by the adding or dropping of bits. It can be found out if there is a transmission error by in some way comparing the total of the sending computer counter 26 with that of the receiving computer counter 32. This is done by transmitting the increase of the five bits of the binary sum in the sending computer counter 26 after the twenty character information bits have been transmitted. When these five bits called the "computer check" are received, the binary number represented by these five bits is added to the receiving computer counter 32' and under normal transmission condition the binary number on the counter will always be 11111. For example, if the total weighted binary sum of the marking character in the sending and receiving computer counters is 10101, then the inverse of this number or 01010 will be transmitted as the computer check signal. When 10101 is added to 01010 the total is 11111. The five bits of the computer check signal are added to the receiving computer counter 32' in the same way that the characters were read into storage. Gates 172–10, 172–1, 173–A, 173–4 and 173–7 read the five bits during the Y time group and produce negative outputs when marks are received. These outputs are then applied directly to the counter as in the case of the fourth and fifth bits by way of gates 172–A, 172–H and 173–H in the case of the first, second and third bits. When transmission has occurred correctly and the receiving computer counter adds up to binary 11111, the fact is recognized by applying the set sides (ground when "one") of the five flip-flops 176–1, 176–2, 177–3, 177–4, 178–5 to the inputs of paralleled gates 173–10 and 173–1. The output will be negative for 11111.

A read computer gate 150–10 in delivery control 36' is also placed in parallel with gates 173–10 and 173–1 so that the negative output for 11111 will only occur during that portion of the EDAC signal when we want to "read the computer." Therefore, a negative read computer pulse occurs during the middle of the fifth time section of time group Y when an information block has been transmitted correctly. This computer check pulse performs two separate functions. One function is to set flip-flop 48–1, 48–4 in acceptance control 38 of the sending portion of the EDAC terminal I so that a good acceptance signal may be transmitted back along the second channel to inform the sending EDAC terminal I that the information block which was just sent has been received correctly; see "Sending Acceptance" above. The other function is to unblind the teleprinter delivery output so that the information in the receiving storage may be read out (second read out) to the teleprinter 16'. The unblinding of the delivery output is performed by applying the computer check pulse to the delivery control circuits 36'. This is explained below under "delivery control."

Going back to the receiving storage 1A in matrix 29', character 1A is read out for the second time by the application of negative pulse M, A to readout control gate 151–4. This produces a ground which is applied via emitter follower 126–D to the receiving storage 1A read out gates 151–10, 152–A, 153–14, 153–10, 154–10. These gates which produce negative marking pulses at the five inputs 1A1, 1A2, 1A3, 1A4, 1A5 to the block A combining gates 260. This second readout occurs after the EDAC characters have been all read into storage and the receiving computer counter 32' has been read. As explained before each of the five outputs of the combining gates are ground when a mark is read out of its associated bit level in storage. The output of the combining gates are applied to five gates 202–10, 202–A, 202–4, 203–4, and 203–A, in the delivery distributor 264'. Delivery time pulses "1" through "5" are applied to these gates to distribute the five bits in time sequence. The negative marking outputs of these gates along with the negative rest pulse are combined by parallel gates 202–H and 203–10 to produce a ground marking teleprinter signal. This signal is applied to gates 203–1 and 205–H in delivery relay drive 272' to drive the delivery output polar relay 274' connected to teleprinter 16'. The signal is also applied to gates 206–1 and 206–10 in the delivery (clear) relay drive 271' to drive the delivery (clear) output polar relay 276'. This drive is blinded (steady mark) by the delivery control output when a block of characters which contain an error is read out of storage. This is done by applying the output of the delivery control 36' to gates 206–4 and 206–H in delivery relay drive 271'. The delivery control output is normally ground but is negative for those delivery time blocks which are to be inhibited or not delivered. After delivery, the storage block is reset by a reset pulse from gate 125–1 and emitter follower 126–B in reset storage block A circuit 360'.

*Delivery control*

Under normal conditions the output of the delivery control 36' will always be a ground. The normal conditions are when there are no transmission errors and the receiving computer counter 32' compares correctly during every receiving block and a negative read computer pulse is therefore formed after the reception of each block of information. Under abnormal conditions, when an error occurs, a read computer pulse does not occur and this causes the delivery control signal to immediately become negative and make the delivery output (clear) to the teleprinter 16' a steady mark so that the errored information in the receiving storage 29' or 30' is not read out to the teleprinter 16'. The delivery control signal remains negative for a time equivalent to the length of time required to read out two storage blocks or a multiple of two storage blocks. If an error occurs in the reception of block A, then a read computer pulse will not be produced during block A and the output of the delivery control 36' will remain negative until a block A is received correctly and does produce a read computer pulse. Even though a read computer pulse may be received during reception of block B the negative delivery control signal will not be removed until the read computer pulse occurs during block A. If block B storage was originally errored, the same situation would occur and the delivery control signal would remain negative until block B storage was received correctly at matrix 30'.

The negative read computer pulse is inverted by gate 150–10 whose output is applied to gates 150–H and 150–A. When gate 150–H has three grounds applied to its input, it will have a negative output pulse. This pulse occurs at the same time as the read computer pulse but only during the receiving of block A. The output of gate 150–A will also be a negative pulse which occurs at the same time as the read computer pulse but only during receiving of block B. The outputs of gates 150–H or 150–A therefore have negative outputs which indicate whether the information block A or B respectively has been received correctly. The negative output of gate 150–H is applied to gate 148–4 of a flip-flop consisting of back-to-back NOR gates 148–4 and 148–1. This sets the flip-flop which stores and indicates the fact that storage block A has been received correctly. The negative output of gate 148–1 of the set flip-flop is applied to gate 149–4. This output is the delivery control signal and is therefore ground when the receiving storage block A is received correctly. Once block A has been delivered to the teleprinter from storage, matrix 29' the delivery block A timing input to gate 148–1 of the flip-flop turns negative and resets the flip-flop so that the output of gate 148–1 is now a ground. The delivery control signal will now be negative unless the other input to gate 149–4 becomes negative. The other input to gate 149–4 comes from gate 150–4 which has the identical circuitry associated with it as gate 148–1 except that this indicates when storage block B has been received correctly. Since the read computer pulse which sets the flip-flops occurs exactly at the beginning of the delivery block A and block B timing, then either one or the other of the two inputs to gate 149–4 will be negative at all times under normal operating conditions and the output of gate 149–4 or the delivery control signal will always be a ground.

Parallel gates 145–7 and 148–7 and gate 148–H comprise a back-to-back NOR gate flip-flop which indicates which receiving storage block was the last one to be received correctly. For example, when block A is received correctly for storage at matrix 29', the negative output of gate 148–1 is applied to gate 148–7 of the flip-flop and therefore the output of gate 148–H will be negative whenever block A is received correctly. In a like manner, the output of gate 150–4 is applied to gate 148–H of the flip-flop and therefore the output of gate 148–7 will be negative whenever block B is received correctly from matrix 30. The output of gate 148–H is therefore negative and is applied to gate 150–H and the output of gate 148–7 is ground and is applied to gate 150–A. If block B is now received correctly, there will be three grounds at the input of gate 150–A, its output will be negative and operation of the delivery control 36' will be normal. If, however, block B is not received correctly then the delivery control signal will become negative for the time duration of delivery of block B, and block B will not be delivered to the teleprinter 16'. If after this block A is received correctly, the negative input to gate 150–H from gate 148–H will inhibit or prevent the output of gate 150–H from going negative, the fact that block A was received correctly will not be recognized and the output of the delivery control 36' will also remain negative for the time of delivery block A. The delivery control signal will therefore become ground again only when block B is received correctly again. The flip-flop consisting of gates 145–7, 148–7 and 148–H therefore insures that information which is delivered to the teleprinter 16' comes alternately from block A and block B storage matrices 29', 30'. Saying it in another way if one of the storage block matrices 29', 30' receives information incorrectly, that information and any subsequent information received by the other storage matrix whether correct or incorrect, will not be delivered to the teleprinter 16' until the first storage matrix receives its information correctly.

The output of gate 150–H is applied to gate 148–H to prevent a racing condition. It prevents the negative output of gate 148–H from being applied to gate 150–H while the output of gate 150–H is negative.

*Load control*

In the sending terminal I shown in FIGURES 5A, 5A and 8A–8F, the stepping of the tape reader 14, the resetting of the sending storage matrix 23, 24, the reading into the storage matrices anf the intentional erroring of the computer check signal are all controlled by load control circuit 22. The load control circuit acts in accordance with the acceptance signal which is received from the other EDAC terminal II. If the acceptance signal is received correctly, the load control circuit 22 will reset the appropriate storage matrix 23 or 24; step the tape reader 14 four times; read each of the four characters on the tape 20 into storage in matrices 23, 24 and permit normal transmission of the computer check signal. If the acceptance signal is received incorrectly, the load control will prevent the resetting of the storage matrices 23, 24; prevent the tape reader 14 from stepping; prevent the reading in of any additional information into storage and intentionally error the computer check signal by transmitting five spacing bits as the computer check signal. As in the delivery control circuit 36' of the receiving terminal II, the load control 22 of sending terminal I will respond only to reception of good acceptance signals in alternate time blocks A and B. If a bad acceptance signal is received in one time block, the load control will recognize all acceptance signals subsequently received during the other time block as bad until a good acceptance signal is received during the first time block.

Figure 8C:
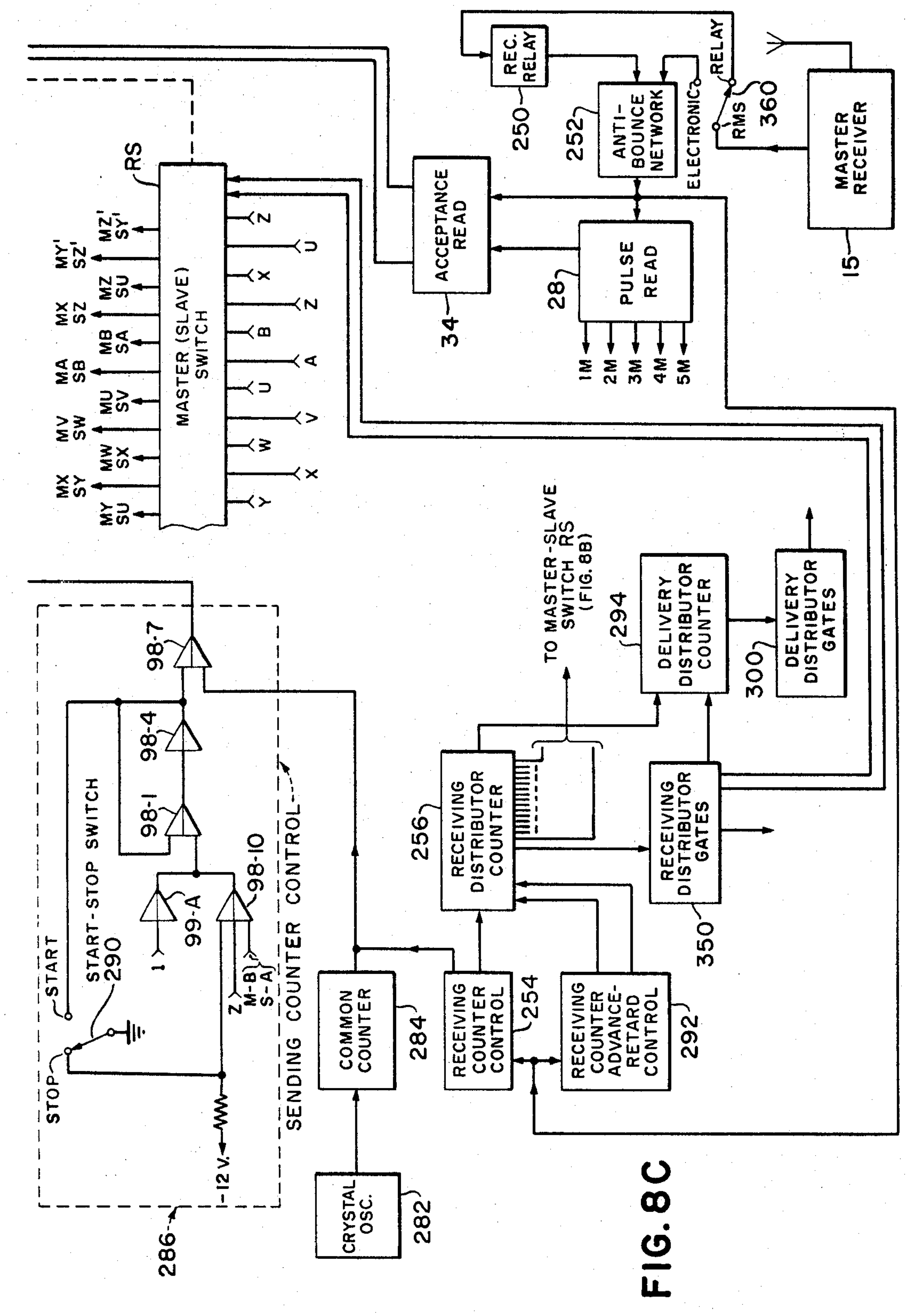
Figure 8D:
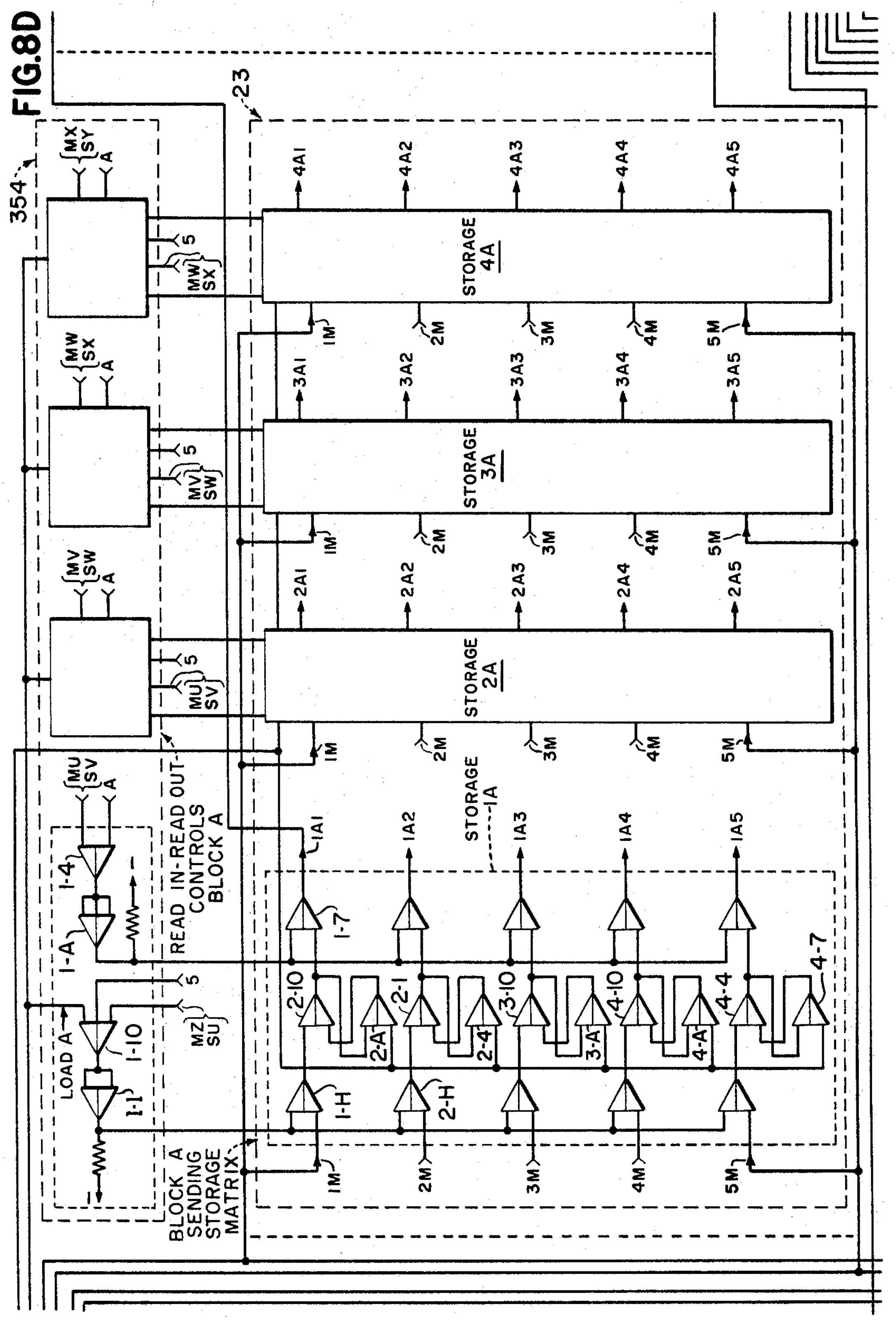
Figure 8E:
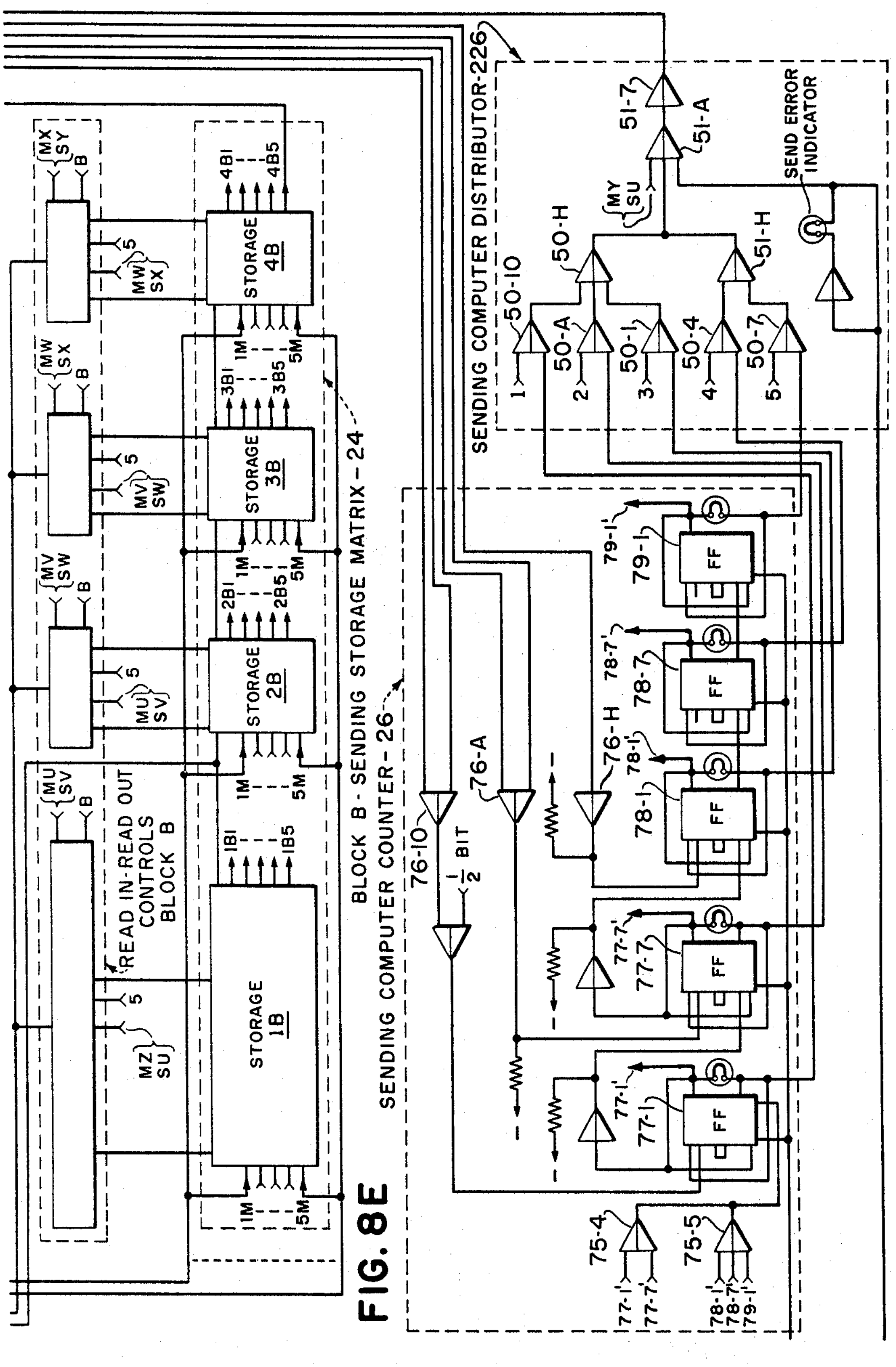
Figure 8F:
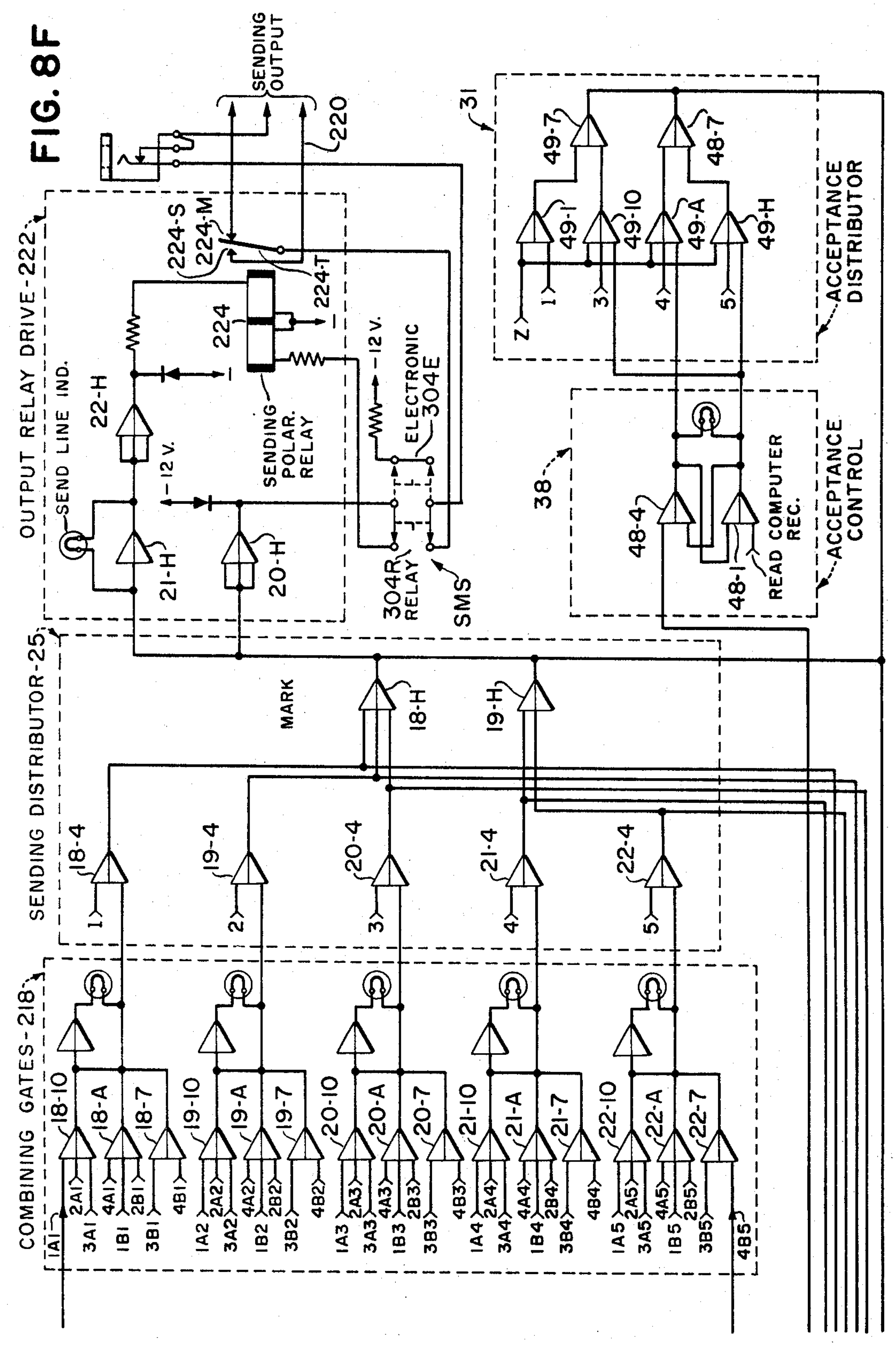
Figure 9E:
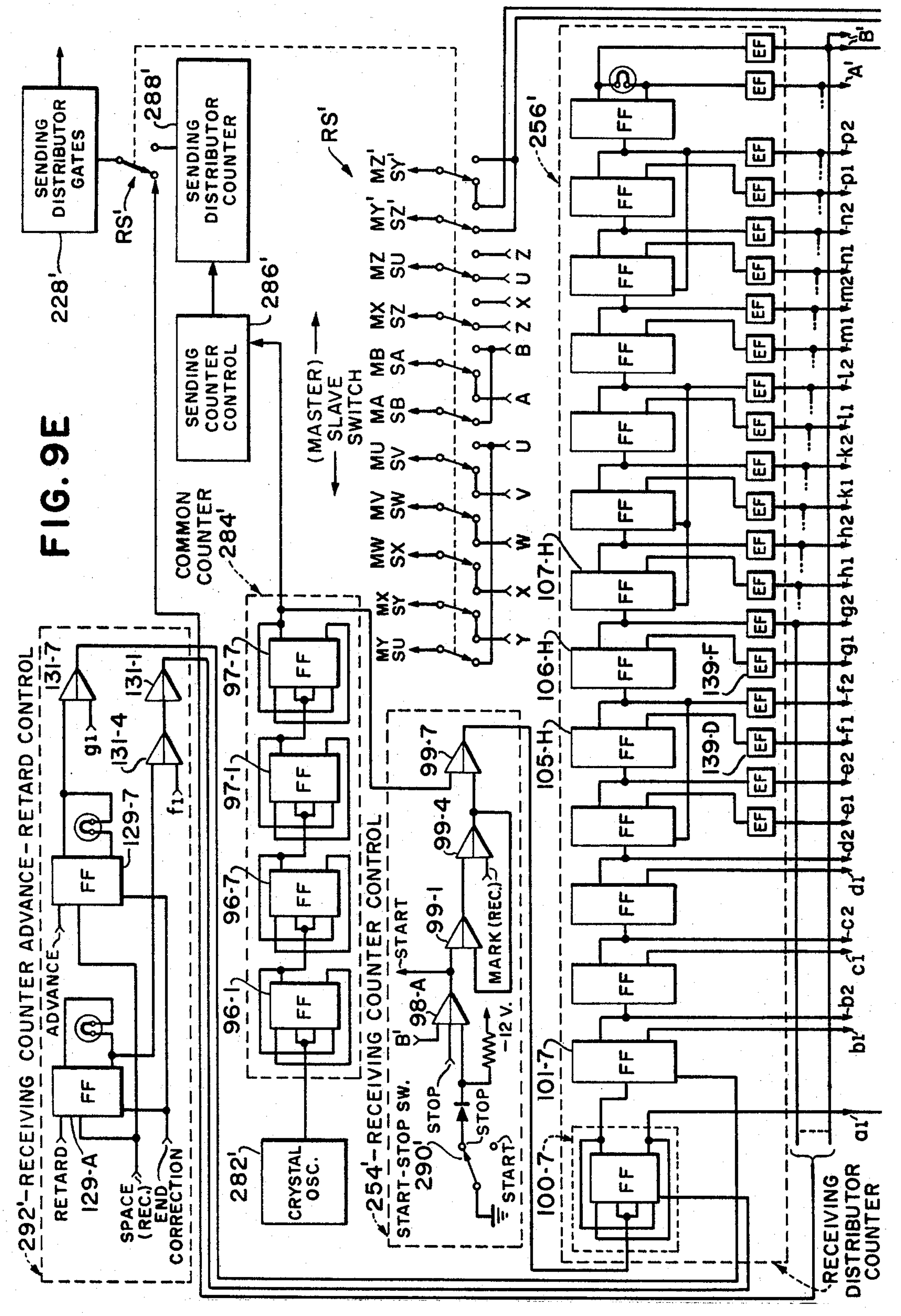
Figure 9F:
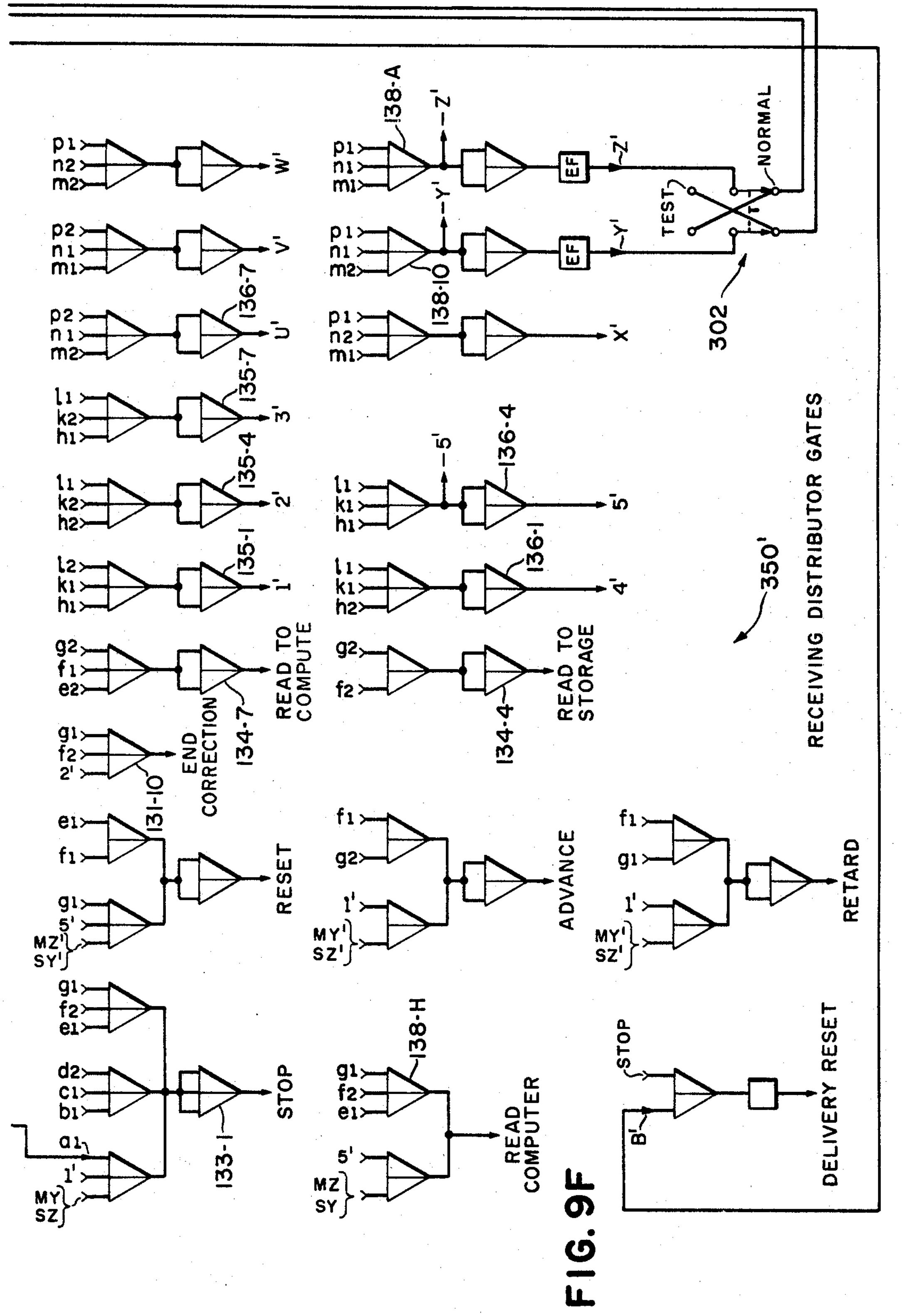
Figure 9G:
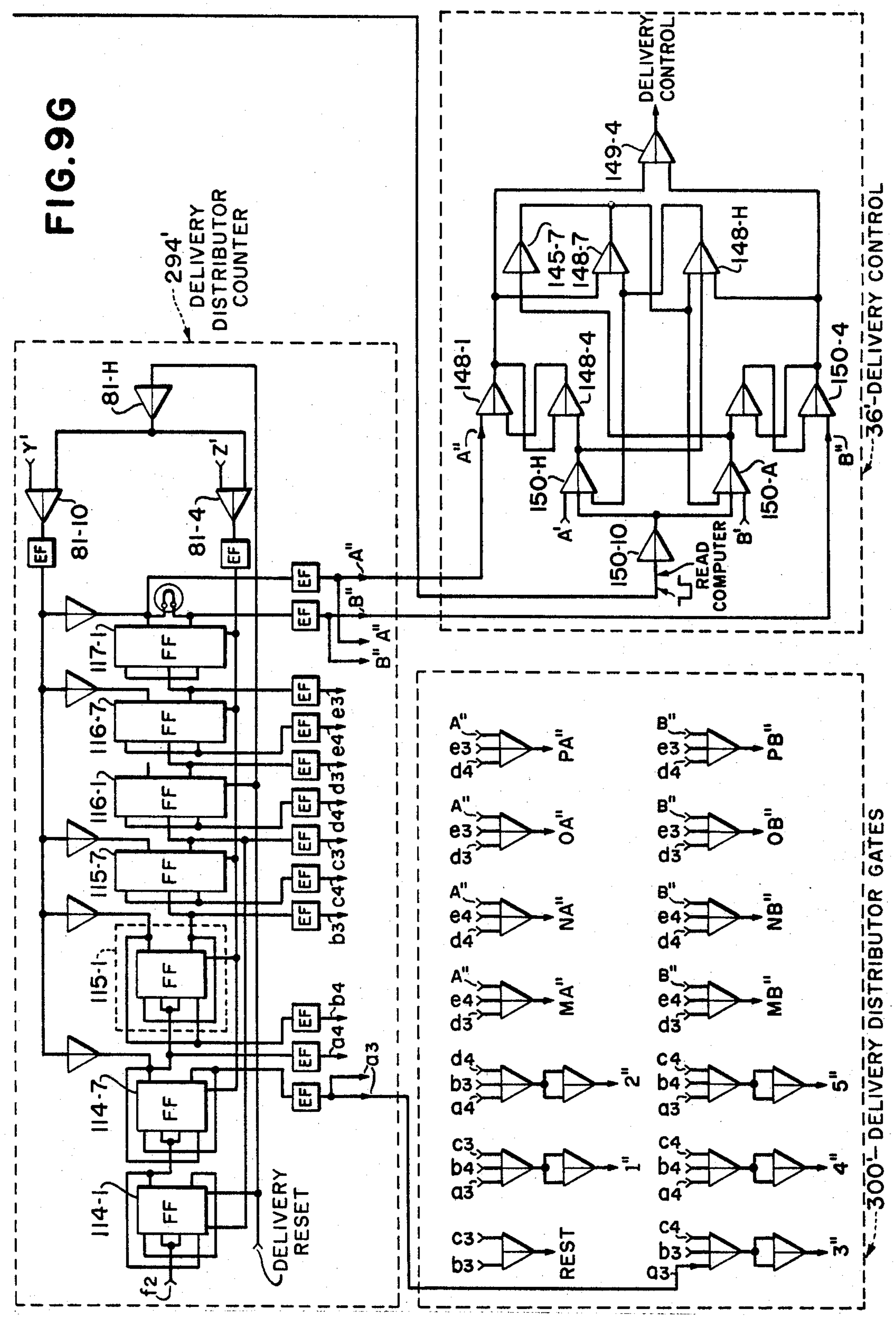

The acceptance signal is received at terminal I and read by the acceptance read circuit 34 at terminal I shown in FIGURES 5B, 8C. Details of this circuit are the same as those of circuit 34' shown in FIGURE 9A to which reference is now made. A good acceptance signal consists of five bits. The first, third and fifth bits are marks and the second and fourth bits are spaces as stated under "sending acceptance" above. The first bit of the acceptance signal which occurs in the Z time group is read by gate 124–4 of circuit 34. The two ground inputs to the gate are SZ and 1M. If the first bit received in the Z time group is a mark the output of gate 124–4 will be a negative pulse. The R signal will therefore be negative when the first bit of the acceptance signal RSCCC is received correctly. The other gates of the acceptance read circuit 34 read the second, third, fourth and fifth pulses to determine if they have been received incorrectly. In other words, they read to ascertain if the second and fourth bits are marks and if the third and fifth bits are spaces. If any one of these bits is read to be incorrect then a negative pulse appears at the output of gate 124–7. Gate 124–10 has a negative output when the third bit is a space. Gate 124–A has a negative output when the fifth bit is a space. Gate 122–A in pulse read circuits 28 of terminal I has a negative output when the second bit is a mark. This gate is shown in FIGURE 9E where the details of pulse read circuit 28' are the same as in pulse read circuit 28. Gate 121–10 has a negative output when the fifth bit is a mark. The outputs of acceptance read gates 124–10, 124–A, 122–A and 121–10 are applied to the inputs of paralleled gates 124–1 and 124–H. The output of these paralleled gates is a ground for any second or fourth bits marking and for any third of fifth bits spacing. This ground is applied to the input of gate 124–7 along with the time, group Z pulse to produce a negative output SC at gate 124–7 for any incorrect second, third, fourth or fifth bit in the received acceptance signal.

Referring now to the load control 22 of terminal I as shown in FIGURE 8A, paralleled gates 71–A and 71–H and gate 71–7 comprise a back-to-back NOR gate flip-flop. The flip-flop is reset at time "1" in timing group Y by the negative output of gate 76–4 being applied to gate 71–H of the flip-flop, thereby causing the output of gate 71–7 of the flip-flop to be negative. This output is called the RSCCC acceptance signal. The R signal from the acceptance read circuit 34 at terminal I is applied to gate 71–7 of the flip-flop. If the first bit of the acceptance signal is received correctly (marking) the R signal will be a negative pulse and will set the flip-flop to make the output of gate 71–7 a ground. If the other four bits of the acceptance signal are received correctly the input SC to gate 71–H will be a steady ground and the flip-flop will remain set with a ground output at gate 71–7 indicating that the acceptance signal received was good. The flip-flop will then be reset "bad" at time "1" in timing group Y of block A and will be ready to read the next acceptance signal. If any one of the remaining four bits of the acceptance signal is incorrect, the output SC of gate 124–7 will have a negative pulse which is applied to gate 71–H of the flip-flop. This will immediately reset the flip-flop to "bad" and cause the output of gate 71–7 to be negative indicating that the acceptance signal was received incorrectly.

The RSCCC acceptance signal output of gate 71–7 is applied to gates 68–A and 68–H in load control 22. Parallel gates 68–H and 73–A have a timing input at time "5½" the output of gate 68–H will be negative if the acceptance signal was received correctly during block A. Note that this reading of the RSCCC acceptance signal occurs immediately before the RSCCC accepance flip-flop 71–A, 71–H, 71–7 is reset at time "1" in timing group Y. The negative pulse output of gate 68–A indicates that a correct acceptance signal has been received during sending block B. This means that the information previously transmitted during sending block A was received at the other EDAC terminal II correctly and that the loading of the following block A may proceed normally. The negative output of gate 68–A is applied to gate 68–4 which sets the flip-flop consisting of back-to-back NOR gates 68–4 and 68–7. When the flip-flop is set the output Load A of gate 68–4 is a ground. This ground allows three functions to take place: (1) It allows the tape reader 14 to step. (2) It allows block A sending storage matrix 23 to be reset. (3) It allows new information to be read into block A sending storage matrix 23 as described above in "Loading Information From Tape."

Gates 72–H and 72–A comprises a back-to-back NOR gate flip-flop which indicates during which sending block the last good acceptance signal was received. When the acceptance signal is received correctly during sending block B the negative output of gate 68–7 is applied to gate 72–H which causes the output of gate 72–A to be negative. After the three aforementioned functions which are produced by the grounded Load A signal are completed, the Load A flip-flop 68–4, 68–7 is reset by a negative pulse being applied by gate 68–10 to gate 68–7 during time AX.

Gates 68–H, 73–A, 69–H and 69–7 and 69–4 perform the identical functions for reading the acceptance signal during block A as gates 68–A, 73–10, 68–10, 68–7 and 68–4 do for reading the acceptance signal during block B.

The negative output of gate 72–A is applied to gate 73–10 so that when a good acceptance signal is read during block B no subsequent acceptance signals can be read as correct during block B unless a good acceptance signal is first read during block A. This performs the same function as gates 148–7 and 148–H performed in the delivery control circuit 36' at terminal II; see "Delivery Control" above. The flip-flop consisting of gates 72–H and 72–A therefore insures the Load A and Load B ground signals occur alternately and that two consecutive Load A or two consecutive Load B signals will never occur.

The negative output of gate 68–A is applied to gate 72–A to prevent a racing condition. It prevents the negative output of gate 72–A from being applied to gate 73–10 while the output of gate 68–A is negative.

*Computer control*

Under normal conditions the computer control signal which is applied to the sending computer distributor 226 from computer control circuit 230 in terminal I is a ground during the time of transmission of the computer check signal. This ground has no effect on the transmission of the signal. Normal conditions mean that all the acceptance signals received from terminal II are good and that alternate Load A and Load B signals are produced by the load control circuits 22 during alternate sending signal blocks A and B. If however, a bad acceptance signal is received from terminal II then the transmission of the computer check signal from terminal II then the transmission of the computer check signal from terminal I must be intentionally errored by applying a negative computer control signal to the sending computer distributor 226 during the time that the next computer check signal is to be transmitted. If a bad acceptance signal is received twice in succession at sending terminal I, then the second computer check signal transmitted must *not* be errored. In general, if the acceptance signals are received bad for a number of consecutive blocks, then the computer check signals transmitted must be intentionally errored only during alternate blocks. The computer control circuits 230 perform this function.

Under normal conditions the computer check signal which is transmitted during sending block B occurs when a good acceptance signal has been received during sending block B and the output of gate 72–H in the load control 22 is a ground. This ground is applied to gate 72–7 in computer control 230, together with the ground from time block B to produce a negative output. The negative output of gate 72–7 is applied to gate 72–4 whose output is ground. This grounded output is the computer control signal and allows normal transmission of the computer check signal to terminal II. In a like manner gate 72–1 has a negative output during transmission of the computer check signal in sending block A when a good acceptance signal has been received in sending block A. The negative output of gate 72–1 is applied to gate 72–4 to produce the grounded computer control signal.

When a bad acceptance signal is received, the flip-flop consisting of gates 72–H and 72–A in the load control remains in the same condition for at least an additional two time blocks. Since the outputs of the flip-flop are applied to gate 72–7 and 72–1, then when the block inputs A and B which are applied to these same gates change in polarity during the time blocks when the bad acceptance signal is received, gates 72–7 and 72–1 each have a negative signal applied to them. This causes the outputs of both of these gates to be ground at the time when the computer check signal is to be transmitted. Since both of these grounded outputs are applied to gate 72–4, then the output of gate 72–4 will be negative and the computer control signal will be negative at this time. This will intentionally error the computer check signal. During the next time block, the block A and B time signals will again change in polarity and since the flip-flop consisting of gates 72–H and 72–A has still not changed its state, then the computer control signal will revert back to a ground and the next computer check signal will *not* be intentionally errored. This alternate transmission of good and intentionally errored computer check signals will continue until a good load or Load B signal is received which will bring the sending circuits back to normal conditions.

*EDAC timing, counters, and controls*

The EDAC oscillator 282 or 282' control the speed of operation of EDAC apparatus at the terminals I and II respectively. For 100 words per minute, 7.5 bit operation, the oscillator frequency will be 111,597 cycles per second. The oscillator may be crystal controlled and transistorized. The crystal may be mounted in an oven for temperature stability. Oscillator 282 drives a common binary counter 284 or 284' consisting of four flip-flops 96–1, 96–7, 97–1, 97–7 which divide the oscillator frequency by sixteen, see FIGURE 9E. The output of the common counter 284 is applied to sending counter control circuit 286 and to the receiving counter control circuit 254.

The sending counter control circuit 286 applies the signal from the common counter 284 to the sending distributor counter 288. A flip-flop consisting of back-to-back NOR gates 98–1 and 98–4 controls the signal; see FIGURE 8C. When start-stop switch 290 is START position a ground is applied to the output of flip-flop gate 98–4 which is applied to the input of gate 98–7 together with the output of the common counter 284. Gate 98–7 thereby inverts the common counter signal and applies it to the sending distributor counter 288. When the start-stop switch 290 is thrown to STOP position, a ground is applied to gate 98–10. This gate will have a negative output which is applied to gate 98–1 of the flip-flop. The flip-flop changes its state and the negative output of gate 98–4 which is applied to gate 98–7 causes gate 98–7 to have a steady ground output and the sending distributor counter 288 stops.

Receiving counter control 254 or 254' applies the signal from the common counter 284 or 284' to receiving distributor counter 256 or 256'. This operates in the same manner as the sending counter control 286 or 286' with two exceptions. First, the signal is applied at the first spacing pulse received after throwing the switch 290 to START position. The spacing pulse is a negative mark signal which is applied to gate 99–4 to flip the flip-flop, see FIGURE 9E. Second, the signal is removed at "STOP" time in block B after throwing the switch 290 to the STOP position instead of at time "1" in timing group Z, block B. The STOP pulse is produced by gate 133–1 in the receiving distributor gates 350 or 350'; see FIGURE 9D.

The sending distributor counter 288 or 288' is a binary counter and consists of fourteen flip-flops; see FIGURE 8B. The last flip-flop 133–1 times the sending blocks A and B and produces the A and B timing signals at emitter followers 90–4, 90–5 respectively. Flip-flops 110–1, 111–1 and 112–1 time the six time groups U, V, W, X, Y and Z in each block A and B and produce U to Z timing signals via emitter followers connected to gates 86–H, 85–10, 85–A, 87–H, 86–1, 86–4 in the sending distributor gates 228. Flip-flop 107–1, 108–1 and 109–1 time the five time sections or bits "1," "2," "3," "4" and "5" in each timing group and produce timing signals via emitter followers at gates 88–10, 88–A, 88–H, 87–10, 87–A. Flip-flop 106–1 designates the one-half section or bit at output 106A.

The receiving distributor counters 256, 256' are arranged and operate exactly like the sending distributor counters 288, 288' with the exception that a feedback loop may momentarily be added or a feedback loop may momentarily be removed from the counter 256 or 256' to change, in effect, the frequency of the oscillator 282 or 282'. This is done by receiving counter advance-retard control 292 or 292'. In sending distributor counters 288 and 288' there is a feedback loop from flip-flop 105–A to the A.C. reset of flip-flop 100–1, and there is no feedback loop from flip-flop 101–1; see FIGURE 8B. In the receiving distributor counter 256 or 256' the feedback loop from flip-flop 105–H to flip-flop 100–7 corresponding to sending counter flip-flops 105–A and 101–1, is not directly connected but first goes through emitter follower 139–D and then through gates 131–4 and 141–1 in the advance-retard control circuit 292. The other input to gate 131–4 comes from the retard flip-flop 129–A and is normally a ground so that it does not interfere with the transmission of the feedback loop through gates 131–1 and 131–4. The output of flip-flop 106–H is applied through emitter follower 139–F to gate 131–7 in the advance-retard control 292 in 292'; see FIGURE 9E. The output of the advance flip-flop 129–7 is normally negative and is also applied to gate 131–7 is applied to the A.C. reset of flip-flop 101–7 but since it is a steady ground, it has no effect on the counter. The normal reset condition of the advance retard flip-flops is produced by applying a grounded "end correction" pulse from gate 131–10 in receiving gate group 350 or 350' to the A.C. resets of the flip-flops.

The receiving distributor counter 256' at terminal II is started when the first spacing signal is received. This is the start pulse received from the transmitter 18'. The counter starts at the middle of the R section of the EDAC receiving distributor signal when the STOP pulse received from gate 133–1 had previously stopped the counter 256'. Under operating conditions where the oscillator frequencies of the two EDAC terminals I and II are exactly the same the rest-start (mark-space) transition of the received EDAC signal at terminal II will always occur in the middle of the R section of receiving distributor counters 256 and 256' where the STOP pulse is produced. Under these conditions, the advance and retard flip-flops 129–7, 129–A will always remain reset and the feedback loops in the sending and receiving distributor counters at both terminals will be the same.

If the oscillator 282' at slave terminal II has a slightly lower frequency than oscillator 282 at the master terminal I, the rest-start transition of the received line signal will drift in time with respect to the receiving distributor signal so that the transition will occur before the middle off the R section of the receiving distributor and adding or removing the aforementioned feedback loops to increase or decrease the speed of the receiving counter. The SPACE signal or output of emitter follower 123–K in anti-bounce network 252' follows the received line signals and is ground when a space is received. This signal, which contains the rest-start transition, is applied to the set inputs of the advance and retard flip-flops 129–7, 129–A. A ground "retard" signal is applied to the set pedestal of the retard flip-flop 129–A and a ground "advance" signal is applied to the set pedestal of the advance flip-flop 129–7. The retard signal or gating pulse occurs after the middle of the R section and if the rest-start transition occurs during this time, then the frequency of receiving oscillator 282' is too high and the retard flip-flop 129–A sets. This applies a negative signal to gate 131–4 and removes the feedback loop from flip-flop 105–H to flip-flop 100–7. The removal of the feedback loop slows down the receiving distributor counter 256' and in effect lowers the frequency of the oscillator 282'. The "advance" signal or gate occurs before the middle of the R section and if the rest-start transition occurs during this time, then the receiving oscillator frequency is too low and the advance flip-flop 129–7 sets. This applies a ground instead of a negative signal to gate 131–7 and adds a feedback loop from flip-flop 106–H to flip-flop 101–7. The addition of this feedback loop speeds up the counter 256' and in effect increases the frequency of the oscillator 282'. The "end correction" pulse resets the advance and retard flip-flops 129–7, 129–A during the time section following the R section.

The outputs of sending distributor gates 228 are timing gate pulses produced by inputs from the sending distributor counter 288 at terminal I when MASTER-SLAVE switch RS is in MASTER position. The timing gate groups or pulses A, B, U, V, W, X, Y, Z, "1," "2," "3," "4," "5" and "½" are produced. When switch RS or RS' at terminal I or II is in the SLAVE condition, the timing gate pulses are produced by the receiving distributor counter 256' instead of the sending distributor counter 288', as a result of setting switch RS or RS' to SLAVE position. Then as a result of inputs from counter 256', there are obtained at the receiving distributor gates 258', the timing gate pulses or gate groups: A, B, U, V, W, X, Y, Z, "1," "2," "3," "4," "5," ADVANCE, RETARD, END CORRECTION, RESET, READ TO STORAGE, READ TO COMPUTE, READ COMPUTER, DELIV- ERY RESET and STOP. The receiving gate outputs are distinguished from sending gate outputs in the drawing by primed numbers, letters or symbols which are the same as the corresponding outputs of sending distributor gates 228 or 228'.

The delivery distributor counter 294, 294' at each terminal is a binary counter and consists of seven flip-flops 114–1, 114–7, 115–1, 115–7, 116–1, 116–7, 117–1. The counter is driven by the output of flip-flop 105–H which is in the receiving distributor counter 256'. The output of the flip-flop 105–H is one fourth of the EDAC baud rate. Flip-flop 117–1 designates the timing blocks A and B. Flip-flops 116–1 and 116–7 designate the four character delivery time groups M, N, O, P in each block; see FIGURES 7A, 7B. A character is delivered to the teleprinter 16' during each one of these groups. Flip-flops 114–1, 114–7, 115–1 and 115–7 designate seven time sections R, S, "1," "2," "3," "4," "5" in each group. The delivery blocks A and B each start when the read computer gate pulse is produced by gate 138–H during the corresponding receiving blocks A and B. The delivery time blocks A and B are of the same time duration as the receiving time blocks A and B. The delivery blocks are kept in the proper phase with respect to the receiving blocks A' and B' by applying a delivery reset pulse to the delivery distributor counter 294' to reset all the flip-flops. This synchronizes the delivery distributor counter with respect to the receiving distributor counter 256'. The delivery reset pulse is produced by the STOP gate pulse during receiving block B. Since the read computer pulse occurs during different time groups depending on whether operation is as a master or slave terminal and since the time group in which the STOP gate pulse is produced also changes, then the delivery reset synchronizing pulse must be applied to the delivery counter 294 or 294' so as to set the delivery counter flip-flops to a certain condition when the terminal is operated as a master terminal and to another condition when operated as a slave terminal. In the master condition, the negative delivery reset gate pulse occurs in the receiving Y time group. The delivery reset pulse is inverted by gate 81–H and the ground output is applied to gates 81–10 and 81–4. Gate 81–10 has receiving time group Y applied to it and gate 81–4 has receiving block Z applied to it. Therefore in the master condition only gate 81–10 will ever have two grounds applied to its input at the same time and have a negative output. In the slave condition, the delivery reset pulse occurs during the Z time group and only gate 81–4 will have a negative output. The negative output of gates 81–10 and 81–4 are applied to the delivery distributor counter 294' to set the flip-flops to the proper condition.

The outputs of delivery distributor gates 300 are timing gate pulses produced by inputs from the delivery distributor counter 294 or 294'. These timing gate pulses are: MA, NA, OA, PA, MB, NB, OB, PB, R, "1," "2," "3," "4" and "5"; see FIGURES 7A, 7B. The delivery gate pulses are distinguished from the sending and receiving gate pulses on the logic diagrams by double prime numbers, letters and symbols corresponding to the unprimed, and primed symbols of the sending and receiving gate pulses respectively.

In the slave condition of an EDAC terminal the inputs to the sending distributor gates 228 or 228' come from the receiving distributor counter 256 or 256' instead of the sending distributor 288 or 288'. The time groups in which the EDAC functions are performed are different in the slave condition than in the master condition. The master-slave switch RS or RS' transfers the circuits to make the necessary changes.

For testing purposes, the sending section of either terminal EDAC may be made to send to its own receiving section. This is done by throwing the test-normal switch 302 in gate circuits 350 or 350' to test position and by throwing the master-slave switch RS or RS' to the master position. In test position switch 302 reverses the receiving of Y and Z time groups so that the receiving section of the EDAC terminal under test will function as it would in a slave terminal while the sending section of the terminal acts as it would in a master terminal. This simulates the actual transmission of information from a master EDAC terminal to a slave EDAC terminal.

The sending mode switch SMS, SMS' (see FIGURES 5A, 5D, 8F) allows the output to come from either tongue 224T of the sending polar relay 224 in relay position of the switch or directly from gate 20–H in electronic position of the switch. Gate 20–H in the output relay drive 222 or 222' will send a negative 12 volt marking and a ground spacing signal.

The receiving mode switch RMS or RMS' (see FIGURES 5B, 5C, 9A) allows the input signal to be applied to the coils of the 250 or 250' in relay position of the switch receiving polar relay or directly to the input of gate 121–4 in electronic position of the switch.

It would be well at this point to summarize some of the important features of the EDAC system described in detail above. It will be understood that ten bits of the conventional teleprinter signal block are replaced in the EDAC signal block by an accept-reject signal or character utilizing five bits and a check signal or character utilizing five bits. The accept-reject signal and the check signal are inserted in the EDAC signal block so that the EDAC signal block and the signal block delivered to the teleprinter have the same number of bits and the same baud rate. This enables continuous transmission of new information and delivery to the teleprinter of received information under no-error operating conditions.

Reception of a bad check signal will cause the delivery control circuits to prevent delivery of two consecutive blocks to a teleprinter. This will occur whether or not the check signal received during the receipt of the second block is good or bad. The delivery control circuits will not allow any signal block to be delivered to the teleprinter until a good check signal is received in the block that was previously received as bad or erroneous.

Reception of a bad accept-reject signal (a rejection signal) by the terminal I from the terminal II always causes two consecutive blocks to be retransmitted over and over again until a good (error-free) accept-reject signal is received at the terminal I in response to receipt of a signal block which was previously received in bad (erroneous) condition. At the same time the check signal of every other block which is transmitted is intentionally errored at terminal I. The deliberate introduction of an error into the check signal of the next block transmitted following receipt of a bad accept-reject signal for a preceding block prevents the second terminal from delivering twice to the teleprinter the same error-free signal block. When a condition occurs in which the information was actually received correctly at terminal II but the accept-reject signal was received as erroneous at terminal I due to an error occuring in transmission of the accept-reject signal to terminal I, then the deliberate introduction of an error into the next check signal sent from terminal I will cause the delivery control circuits at terminal II to prevent two consecutive signal blocks from being delivered to the printer.

When terminal II receives errored information in a signal block, a bad accept-reject signal is sent back to terminal I to effect retransmission of that signal block and the next signal block; but since the bad accept-reject signal is due to incorrectly received information and not due to an error in transmission of the accept-reject signal, then it does not matter whether the transmitted check signal of the following signal block is intentionally errored or not, because it will not be delivered to the teleprinter at terminal II in either case.

The method of adding or subtracting feedback paths in the receiving counter at the slave terminal to change, in effect, the oscillator frequency, keeps the receiving distributor counter at the slave terminal in synchronization with the EDAC signal being received at the slave terminal. This advance-retard control thus keeps the slave terminal operating in synchronization with the master terminal.

When the computer check signal is intentionally errored, five spacing bits are transmitted. This is also what would be transmitted and received if the signal was not intentionally errored, but the transmission medium faded and the signal was lost.

In the EDAC system only one control signal is used for each signal block. The signal block must be accepted as correct at a receiving terminal before the signal block can be released from storage at the sending terminal.

The routine followed to correct apparent errors is to deliberately error the check information and thus effect cancellation of a signal block if the preceding signal block has not been accepted as correct. This pattern of transmission and reception is repeated until a particular signal block is accepted. This routine catches all possibilities of circuit failure in either direction of transmission.

In the EDAC system it is not necessary to stop flow of traffic in the direction of transmission opposite to that in which an error occured. The EDAC system further includes an arrangement of two receiving outputs for delivering all traffic received for monitoring or test purposes on one output, with provisions for blanking the output of erroneously received blocks to receive only correct, error-free blocks at the other output.

What is claimed is:

1. An error detection and correction communication system, comprising:

(a) first and second transceiver terminals;

(b) means for generating successive blocks of signal data at the first transceiver terminal;

(c) first storage means at the first terminal for storing the successively generated blocks of signal data;

(d) signal transmission means at the first terminal for transmitting the successive blocks of data to the second terminal while the stored blocks are retained in the first storage means;

(e) computer means at the second transceiver terminal for checking each received block of signal data for errors;

(f) accept-reject signal generating means at the second terminal for transmitting to the first terminal selectively acceptance signals indicating receipt of error-free blocks of signal data, and rejection signals indicating receipt of erroneous blocks of signal data;

(g) second storage means at the second terminal for storing received blocks of signal data;

(h) recording means at the second terminal for recording received blocks of signal data;

(i) delivery means at the second terminal for delivering received blocks of signal data from said second storage means to the recording means;

(j) delivery control means at the second terminal responsive to an erroneous condition of a prior received block of signal data to prevent the delivery means from passing a next received error-free block of signal data to the recording means, said delivery control means effecting cancellation of the received error-free block of signal data from said second storage means while the first terminal retransmits the prior block of signal data, and whereby transmission of the next block of signal data to the second terminal is repeated after retransmission of the prior block of signal data;

(k) first circuit control means at the first terminal responsive to receipt of an acceptance signal from the second terminal indicating receipt of each error-free block of signal data, and effective to clear that particular block of signal data from the first storage means;

(l) error signal generation means at the first terminal for introducing an error in a subsequent block of signal data transmitted to the second terminal after a rejection signal is received from the second terminal indicating that the preceding transmitted block of signal data has been received in erroneous condition; and (m) second circuit control means at the first terminal responsive to receipt of a rejection signal indicating that the preceding transmitted block of signal data has been received in erroneous condition to retain stored in the first storage means the subsequently transmitted block of signal data until an acceptance signal is received at the first terminal indicating that the retransmitted preceding block of signal data has been received at the second terminal in error-free condition.

2. An error detection and correction communication system, comprising:

(a) first and second transceiver terminals;

(b) means for generating successive blocks of signal data at the first transceiver terminal;

(c) first storage means at the first terminal for storing the successively generated blocks of signal data;

(d) signal transmission means at the first terminal for transmitting the successive blocks of data to the second terminal while the stored blocks are retained in the first storage means;

(e) computer means at the second transceiver terminal for checking each received block of signal data for errors;

(f) accept-reject signal generating means at the second terminal for transmitting to the first terminal selectively acceptance signals indicating receipt of error-free blocks of signal data, and rejection signals indicating receipt of erroneous blocks of signal data;

(g) second storage means at the second terminal for storing received blocks of signal data;

(h) recording means at the second terminal for recording received blocks of signal data;

(i) delivery means at the second terminal for delivering received blocks of signal data from said second storage means to the recording means;

(j) delivery control means at the second terminal responsive to an erroneous condition of a prior received block of signal data to prevent the delivery means from passing a next received error-free block of signal data to the recording means, said delivery control means effecting cancellation of the received error-free block of signal data from said second storage means while the first terminal retransmits the prior block of signal data, and whereby transmission of the next block of signal data to the second terminal is repeated after retransmission of the prior block of signal data;

(k) error signal generation means at the first terminal for introducing an error in a subsequent block of signal data transmitted to the second terminal after a rejection signal is received from the second terminal indicating that the preceding transmitted block of signal data has been received in erroneous condition; and (l) circuit control means at the first terminal responsive to receipt of a rejection signal indicating that the preceding transmitted block of signal data has been received in erroneous condition to retain stored in the first storage means the subsequently transmitted block of signal data until an acceptance signal is received at the first terminal indicating that the retransmitted preceding block of signal data has been received at the second terminal in error-free condition.

3. An error detection and correction communications system according to claim 1, wherein the delivery means at the second terminal includes means for disabling the recording means after recording a particular error-free block of signal data to prevent said recording means from re-recording the particular error-free block of signal data, and for reactivating the recording means to record the next received error-free block of signal data.

4. A error detection and correction communications system, comprising:

(a) means for generating at a first terminal successive blocks of signal data, each block consisting in order of information signal bits, check signal bits and accept-reject signal bits;
(b) means for transmitting the successive blocks to a remote second terminal;
(c) means for generating at the second terminal other successive blocks of signal data, each of the other blocks consisting in order of a check signal for the preceding block received from the first terminal, information signals, and of an accept-reject signal for the last block received from the first terminal; and
(d) means for transmitting the other blocks of signal data to the first terminal so that the check signal is transmitted from the second terminal to the first terminal at the beginning of each next succeeding block transmitted by the first terminal to the second terminal, and so that the accept-reject signal arrives at the first terminal before the generation and transmission thereat of the check signal bits of the next block, whereby an error can be introduced into the check signal bits of the next block transmitted by the first terminal following receipt by the second terminal of an erroneous block from the first terminal.

5. An error detection and correction communications system, comprising:

(a) means for generating at a first terminal successive blocks of signal data, each block consisting in order of information signal bits, check signal bits and accept-reject signal bits;
(b) means for transmitting the successive blocks to a remote second terminal;
(c) means for generating at the second terminal other successive blocks of signal data, each of the other blocks consisting in order of a check signal for the preceding block received from the first terminal, of information signals, and of an accept-reject signal for the last block received from the first terminal;
(d) means for transmitting the other blocks of signal data to the first terminal so that the check signal is transmitted from the second terminal to the first terminal at the beginning of each next succeeding block transmitted by the first terminal to the second terminal, and so that the accept-reject signal arrives at the first terminal before the generation and transmission thereat of the check signal bits of the next block; and
(e) means for introducing an error into the check signal bits before transmission of any subsequent block is completed by the first terminal following receipt by the second terminal of an accept-reject signal indicating receipt by the second terminal of an erroneous next preceding block from the first terminal.

6. An error detection and correction communications system, comprising:

(a) first and second transceiver terminals;
(b) means for generating successive blocks of signal data at the first transceiver terminal, each of said blocks comprising information character bits and check character bits;

(c) first storage means at the first terminal for storing two successively generated blocks of signal data;
(d) signal transmission means at the first terminal for transmitting successive blocks of data to the second terminal while the same successive blocks are retained in the first storage means;
(e) computer means at the second transceiver terminal for counting and adding the check character bits of each received block;
(f) accept-reject signal generating means at the second terminal in circuit with said computer means for transmitting to the first terminal selectively:
  (1) accept character bits indicating receipt of an error-free block of signal data when the received check character bits add up to a predetermined number; and
  (2) rejection character bits indicating receipt of and erroneous block of signal data when the received check character bits add up to a number other than said predetermined number;
(g) second storage means at the second terminal for storing two consecutively received blocks of received signal data;
(h) delivery means at the second terminal for delivering received blocks of signal data;
(i) delivery control means responsive to an erroneous condition of a prior received block of signal data to prevent delivery thereof for recording and effective to cancel a received error-free block of signal data from said second storage means if the previously received block has been erroneously received, while the first terminal retransmits the prior erroneously received block and then repeats transmission of cancelled error-free block;
(j) first circuit control means at the first terminal responsive to receipt of an acceptance signal from the second terminal indicating receipt of each error-free block of signal data and effective to clear the corresponding stored block from the first storage means;
(k) error signal generation means at the first terminal for introducing an error into the check character bits of a subsequent block transmitted to the second terminal after a rejection signal has been received from the second terminal indicating that the preceding transmitted block has been received in erroneous condition to prevent delivery of information bits in the subsequent block to recording; and
(l) second circuit control means at the first terminal responsive to receipt of a rejection signal indicating that a transmitted block has been received in erroneous condition and effective to cause the erroneously transmitted block and subsequent transmitted block to be retained in said first storage means until an acceptance signal is received indicating error-free reception of each transmitted block maintained in said first storage means.

References Cited

UNITED STATES PATENTS

| | | | |
|---|---|---|---|
| 2,805,278 | 9/1957 | Van Duuren | 178—2 |
| 2,985,714 | 5/1961 | Barbeau et al. | 178—23 |
| 3,001,017 | 9/1961 | Dirks | 178—23 |
| 3,208,049 | 9/1965 | Doty et al. | 340—172.5 |

MALCOLM A. MORRISON, *Primary Examiner.*

C. E. ATKINSON, *Assistant Examiner.*